United States Patent
Matsuzaki et al.

(10) Patent No.: US 9,521,444 B2
(45) Date of Patent: Dec. 13, 2016

(54) INFORMATION PROVIDING APPARATUS, INFORMATION PROVIDING METHOD, AND INFORMATION PROVIDING SYSTEM

(71) Applicant: Panasonic Intellectual Property Management Co., Ltd., Osaka (JP)

(72) Inventors: Natsume Matsuzaki, Osaka (JP); Manabu Maeda, Osaka (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/813,121

(22) Filed: Jul. 30, 2015

(65) Prior Publication Data

US 2016/0044354 A1    Feb. 11, 2016

(30) Foreign Application Priority Data

Aug. 7, 2014 (JP) .................. 2014-161934
Apr. 16, 2015 (JP) .................. 2015-084523

(51) Int. Cl.
*H04N 21/24* (2011.01)
*H04N 21/25* (2011.01)
(Continued)

(52) U.S. Cl.
CPC ...... *H04N 21/25866* (2013.01); *H04N 21/252* (2013.01); *H04N 21/254* (2013.01);
(Continued)

(58) Field of Classification Search
None
See application file for complete search history.

(56) References Cited

U.S. PATENT DOCUMENTS 8,667,519 B2 * 3/2014 Small ............... H04N 21/4223
                                                    725/10
9,426,509 B2 * 8/2016 Ellis ................... H04H 60/31
(Continued)

FOREIGN PATENT DOCUMENTS

WO    2011/142327    11/2011

*Primary Examiner* — Brian T Pendleton
*Assistant Examiner* — Jean D Saint Cyr
(74) *Attorney, Agent, or Firm* — Greenblum & Bernstein, P.L.C.

(57) ABSTRACT

An information providing apparatus includes: an inputter that obtains log information and personal information corresponding thereto; a tentative ID giver that gives each tentative ID to the personal information at each predetermined timing; a first storage that stores correspondence-relationship information indicating a correspondence relationship between the personal information and the each tentative ID; a receiver that receives a request for outputting information including a requested tentative ID identified by a current tentative ID given and the one past timing when the requested ID was given; an information processor that determines, in accordance with the request, link-relationship information indicating a correspondence relationship between the requested tentative ID and the current tentative ID; a second storage that stores the determined link-relationship information; and an outputter that outputs first information including the requested tentative ID or second information indicating that first-information outputting is not permitted, based on the stored link-relationship information.

12 Claims, 30 Drawing Sheets

(51) Int. Cl.
*H04N 21/258* (2011.01)
*H04N 21/418* (2011.01)
*H04N 21/442* (2011.01)
*H04N 21/45* (2011.01)
*H04N 21/466* (2011.01)
*H04N 21/475* (2011.01)
*H04N 21/441* (2011.01)
*H04N 21/254* (2011.01)
*H04N 21/414* (2011.01)
*H04N 21/643* (2011.01)

(52) U.S. Cl.
CPC . H04N 21/25816 (2013.01); H04N 21/41407 (2013.01); H04N 21/441 (2013.01); H04N 21/44222 (2013.01); H04N 21/64322 (2013.01)

(56) References Cited

U.S. PATENT DOCUMENTS

2002/0169793 A1* 11/2002 Sweeney ............ G06F 17/30424
2003/0188171 A1* 10/2003 DeCenzo ............... H04H 60/33
   713/185
2007/0255643 A1* 11/2007 Capuano ................ G06Q 30/00
   705/37
2014/0129447 A1* 5/2014 Ranalli .................. G06Q 20/29
   705/44
2014/0142854 A1* 5/2014 Sil .......................... G01V 1/288
   702/6

* cited by examiner

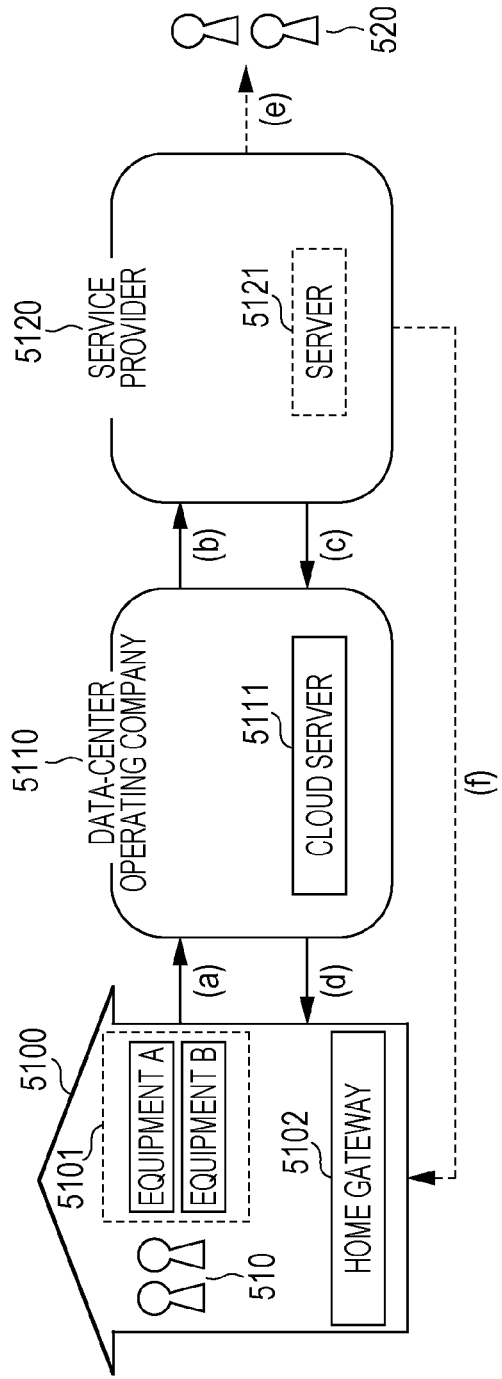
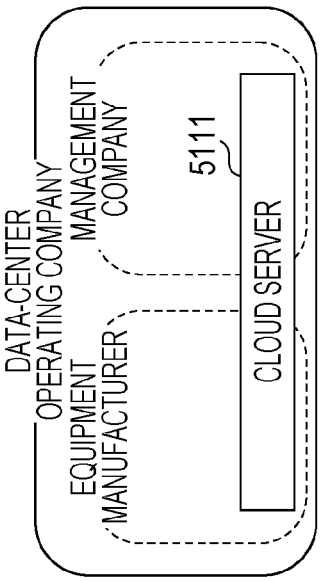
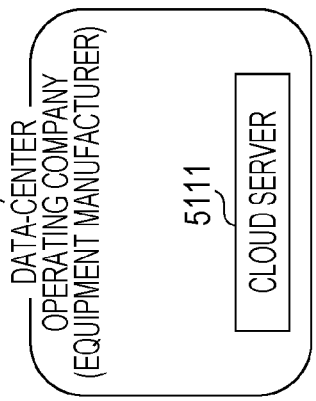

| PERSONAL ID | NAME | POSTAL CODE | AGE | OCCUPATION |
|---|---|---|---|---|
| 1 | Mr. A | 107-0061 | 39 | DANCER |
| 2 | Mrs. B | 107-0051 | 32 | ENGINEER |
| 3 | Mr. C | 106-0032 | 50 | LAWYER |
| 4 | Mrs. D | 105-0046 | 19 | WRITER |

| PERSONAL ID | TIME | VIEWING HISTORY |
|---|---|---|
| 1 | 1/3 9:00 | HISTORICAL DRAMA |
| 1 | ... | |
| 1 | 4/15 10:00 | DOMESTIC ANIMATION |
| 1 | ... | |
| 1 | 7/15 12:15 | COOKING PROGRAM |
| 2 | 7/15 9:00 | FOREIGN FILM |
| 4 | 7/15 19:15 | BASEBALL GAME |

| PERSONAL ID | PERIOD | TENTATIVE ID |
|---|---|---|
| 1 | JANUARY 2014 | ID1_1 |
| 1 | FEBRUARY 2014 | ID1_2 |
| 2 | JANUARY 2014 | ID2_1 |

FIG. 9

| TENTATIVE ID | ATTRIBUTE | TIME | VIEWING HISTORY |
|---|---|---|---|
| (1) ID1_1 | IN 30s | 1 / 3 9:00 | HISTORICAL DRAMA |
| (2) ID1_1 | IN 30s | 1 / 4 7:00 | NEWS |
| (3) ID1_4 | IN 30s | 4 / 15 10:00 | DOMESTIC ANIMATION |
| (4) ID1_4 | ID1_1 | : LINK INFORMATION | |
| (5) ID1_5 | IN 30s | 7 / 15 12:15 | COOKING PROGRAM |
| (6) ID1_5 | ID1_2 | : LINK INFORMATION | |

FIG. 12A

| ID OF DATA COLLECTING APPARATUS | ID OF DATA ANALYZING APPARATUS | HISTORY TRANSMISSION | TENTATIVE ID | ATTRIBUTE | TIME | VIEWING HISTORY |
|---|---|---|---|---|---|---|

FIG. 12B

| ID OF DATA ANALYZING APPARATUS | ID OF DATA COLLECTING APPARATUS | REQUEST COMMAND | SESSION ID | TENTATIVE ID | PERIOD |
|---|---|---|---|---|---|

FIG. 12C

| ID OF DATA COLLECTING APPARATUS | ID OF DATA ANALYZING APPARATUS | NEGATIVE RESPONSE | SESSION ID |
|---|---|---|---|

FIG. 12D

| ID OF DATA COLLECTING APPARATUS | ID OF DATA ANALYZING APPARATUS | AFFIRMATIVE RESPONSE | SESSION ID | TENTATIVE ID | CORRESPONDING TENTATIVE ID |
|---|---|---|---|---|---|

| PERSONAL ID | PERIOD | TENTATIVE ID | WEIGHTING |
|---|---|---|---|
| 1 | JANUARY 2014 | ID1_1 | 10 |
| 1 | FEBRUARY 2014 | ID1_2 | 15 |
| 1 | MARCH 2014 | ID1_3 | 20 |
| 1 | APRIL 2014 | ID1_4 | 25 |
| 1 | MAY 2014 | ID1_5 | 30 |
| 1 | JUNE 2014 | ID1_6 | 35 |
| 1 | JULY 2014 | ID1_7 | 40 |

| PERSONAL ID | TIME | VIEWING HISTORY | DEGREE OF UNIQUENESS |
|---|---|---|---|
| 1 | 1/ 3 9:00 | HISTORICAL DRAMA | 0.2 |
| | ... | | |
| | 4/ 15 10:00 | DOMESTIC ANIMATION | 0.6 |
| | ... | | |
| | 7/ 15 12:15 | COOKING PROGRAM | 0.8 |
| 2 | 7/ 15 9:00 | FOREIGN FILM | 0.8 |
| 4 | 7/ 15 19:15 | BASEBALL GAME | |

FIG. 17

REQUEST FORM FOR LINK INFORMATION

I REQUEST THE FOLLOWING LINK INFORMATION.

TENTATIVE ID  ID1_4
MONTH  JANUARY

APPLY

FIG. 18

RESPONSE TO REQUEST

JANUARY TENTATIVE ID CORRESPONDING
TO ID1_4 IS AS FOLLOWS:
    ID1_1
WHEN YOU WISH TO DOWNLOAD LOG INFORMATION,
CLICK THE FOLLOWING BUTTON.

DOWNLOAD LOG INFORMATION

FIG. 19

RESPONSE TO REQUEST

PROVIDING JANUARY TENTATIVE ID
CORRESPONDING TO ID1_4 WAS NOT PERMITTED
BECAUSE OF THE PRIVACY POLICY.

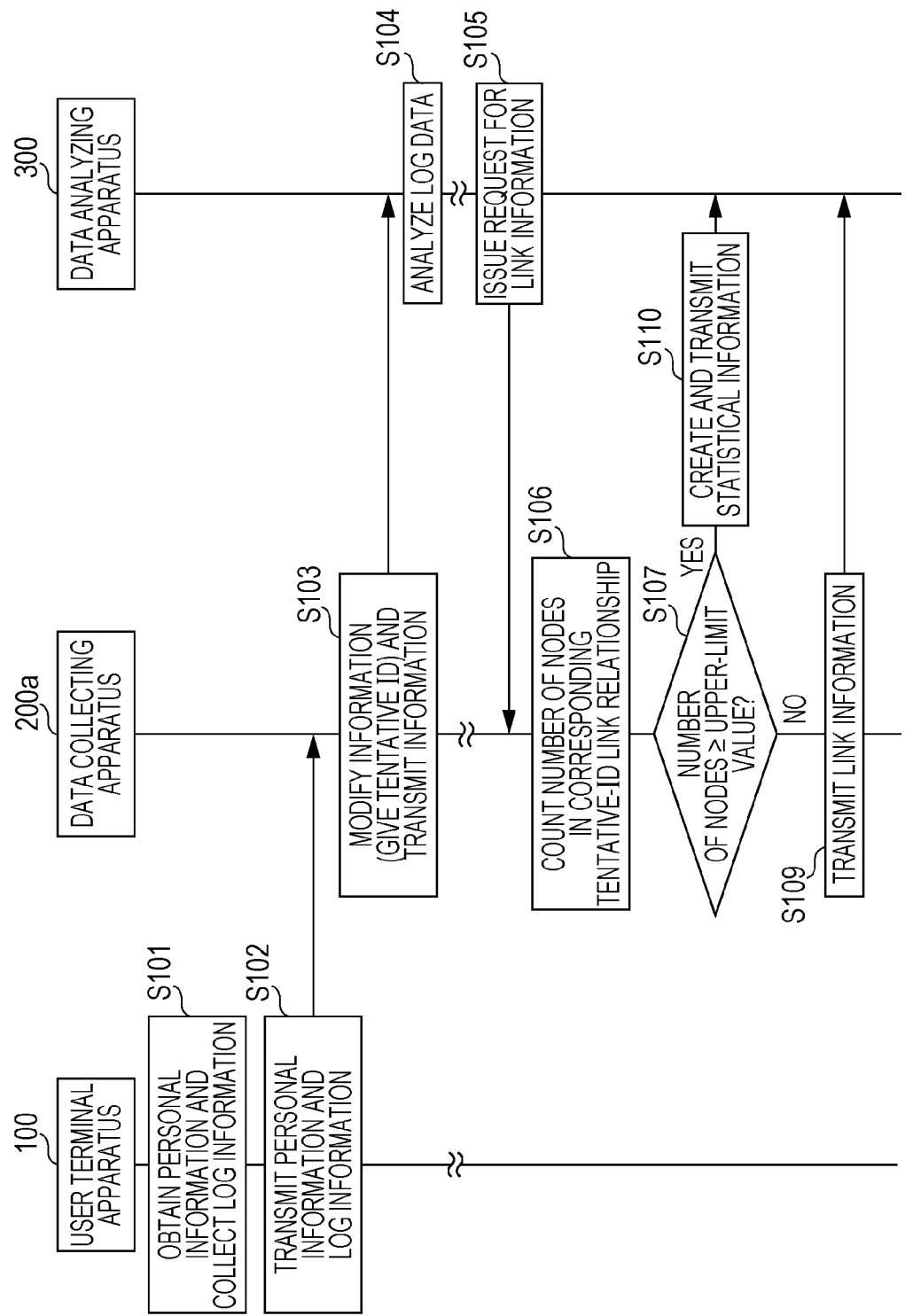

FIG. 22

REQUEST FORM FOR LINK INFORMATION

I REQUEST THE FOLLOWING LINK INFORMATION.

TENTATIVE ID  ID1_4
MONTH  JANUARY

IF PROVIDING LINK INFORMATION IS NOT PERMITTED,
I REQUEST TRANSMISSION OF THE FOLLOWING STATISTIC INFORMATION.

■ FREQUENCY INFORMATION

■ TOTAL OF FREQUENCY INFORMATION
OF THIS ID AND OTHER IDs        IDx_4, IDy_4

EXAMPLE OF FREQUENCY INFORMATION

APPLY

DRAMA  SPORTS  HORSE RACING  COOKING PROGRAM

FIG. 23

RESPONSE TO REQUEST

PROVIDING JANUARY TENTATIVE ID CORRESPONDING TO
ID1_4 WAS NOT PERMITTED BECAUSE OF THE PRIVACY POLICY.

INSTEAD, YOU CAN DOWNLOAD THE
FOLLOWING STATISTICAL INFORMATION.

FREQUENCY INFORMATION

DOWNLOAD STATISTICAL INFORMATION

FIG. 24

RESPONSE TO REQUEST

PROVIDING JANUARY TENTATIVE ID CORRESPONDING TO
ID1_4 WAS NOT PERMITTED BECAUSE OF THE PRIVACY POLICY.

INSTEAD, YOU CAN DOWNLOAD THE
FOLLOWING STATISTICAL INFORMATION.

TOTAL OF FREQUENCY INFORMATION
OF THIS ID AND OTHER IDs     IDx_4, IDy_4

DOWNLOAD STATISTICAL INFORMATION

INFORMATION PROVIDING APPARATUS, INFORMATION PROVIDING METHOD, AND INFORMATION PROVIDING SYSTEM

BACKGROUND

1. Technical Field

The present disclosure relates to an information providing apparatus, an information providing method, and an information providing system that anonymize and provide log information.

2. Description of the Related Art

In recent years, for example, among household electrical and electronic equipment or audio-visual (AV) equipment, the number of pieces of equipment that can connect to networks is increasing. In conjunction with the increase, a scheme in which a cloud service provider collects various types of log information including an operation history of the household electrical and electronic equipment or AV equipment over a network is being studied. The cloud service provider analyzes the collected log information and provides a service and/or utilizes the collected log information for new-product development or marketing strategy.

When the log information is to be provided to a third party, it is necessary to anonymize the log information so that the owner of the data thereof cannot be identified. As a method for the anonymization, there is a scheme called "k-anonymity" for modifying data by erasing a characteristic attribute of the like so that individuals cannot be narrowed down to k or less individuals (see, for example, Intentional Publication No. WO/2011/142327).

However, it is difficult to apply the k-anonymity to information to which content is added over time, like log information.

SUMMARY

One non-limiting and exemplary embodiment provides an information providing apparatus, etc. that can provide log information, with ensured anonymity.

In one general aspect, the techniques disclosed here feature an information providing apparatus including: an information providing apparatus includes: an inputter that obtains log information and personal information corresponding thereto; a tentative ID giver that gives each tentative ID to the personal information at each predetermined timing; a first storage that stores correspondence-relationship information indicating a correspondence relationship between the personal information and the each tentative ID; a receiver that receives a request for outputting information including a requested tentative ID identified by a current tentative ID given and the one past timing when the requested ID was given; an information processor that determines, in accordance with the request, link-relationship information indicating a correspondence relationship between the requested tentative ID and the current tentative ID; a second storage that stores the determined link-relationship information; and an outputter that outputs first information including the requested tentative ID or second information indicating that first-information outputting is not permitted, based on the stored link-relationship information.

According to this aspect, it is possible to provide log information, with ensured anonymity.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 1A to 1C are diagrams each illustrating an overall configuration of an information providing system in embodiments;

FIG. 5 is a table illustrating one example of data recorded in a personal-information recorder;

FIG. 6 is a table illustrating one example of data recorded in a log-information recorder;

FIG. 7 is a table illustrating one example of data stored in a tentative-ID manager;

FIG. 9 illustrates an example of data transmitted by an information communicator;

FIGS. 12A to 12D are schematic diagrams illustrating application programming interfaces (APIs) used in the operation of the information providing system;

FIG. 13 is a table illustrating one example of weighted data stored in the tentative-ID manager;

FIG. 16 is a table illustrating one example of data (a viewing history) for which degrees of uniqueness are specified;

FIG. 17 illustrates one example of a link-information request form;

FIG. 18 illustrates one example of a display screen when providing link information is permitted;

FIG. 19 illustrates one example of a display screen when providing the link information is not permitted;

FIG. 21 is a sequence diagram illustrating the operation of an information providing system according to the second embodiment;

FIG. 22 illustrates one example of a link-information request form according to the second embodiment;

FIG. 23 illustrates one example of a display screen according to the second embodiment when providing link information is not permitted;

FIG. 24 illustrates one example of a display screen that is displayed when providing the link information is not permitted and that includes an entry form for a tentative ID used for statistical information;

DETAILED DESCRIPTION (Knowledge Underlying Present Disclosure)

Figure 2:
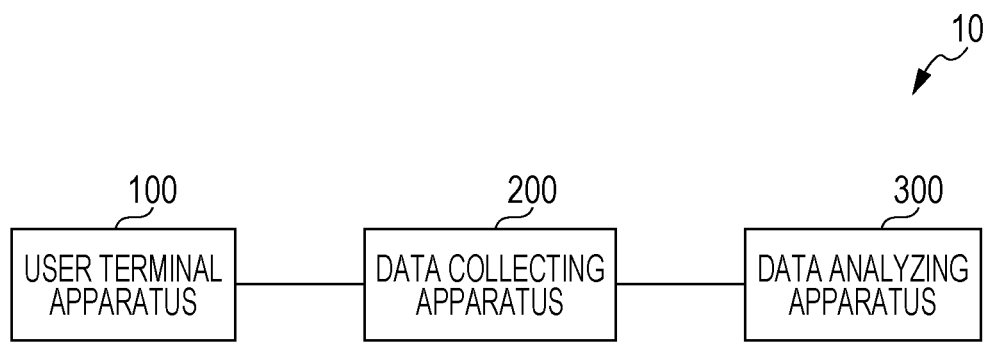
FIG. 2 is a diagram illustrating an overall configuration of an information providing system according to a first embodiment.

From the viewpoint of personal information protection, it is necessary to ensure anonymity when log information is provided. As a method for preventing an individual from being identified based on log information, for example, there is a method in which an ID for the same individual is re-assigned every predetermined period, such as every month, when the log information is provided. In the following description, an ID that is re-assigned to the log information every predetermined period is referred to as a "tentative ID".

In this case, for example, if the tentative ID is re-assigned every month, a user of the log information (a person who receives the log information that is provided) cannot perform data analysis beyond the period (a month). Since the tentative ID is re-assigned when one month is exceeded, it is not possible to perform data analysis, such as comparing the current log information with log information of a year ago for the same individual, based on the tentative ID. On the other hand, if the tentative ID is not re-assigned, there is a risk of an individual being identified based on the log information.

Accordingly, the present inventors have found a configuration in which the anonymity is ensured and the user of the log information can perform data comparison based on the log information corresponding with a certain number of tentative IDs.

(1) An information providing apparatus according to one aspect of the present disclosure includes: an inputter that obtains log information and personal information corresponding to the log information; a tentative ID giver that gives tentative IDs to the personal information, each of the tentative IDs being given at each predetermined timing; a first storage that stores correspondence-relationship information indicating a correspondence relationship between the personal information and the each of the given tentative IDs; a receiver that receives a request for outputting information including a requested tentative ID given at one past timing, on the request the requested tentative ID being identified by i) a current tentative ID given to the personal information and ii) the one past timing when the requested ID was given to the personal information; an information processor that determines, in accordance with the request, link-relationship information indicating a correspondence relationship between the requested tentative ID and the current tentative ID, based on the correspondence-relationship information stored in the first storage; a second storage that stores the determined link-relationship information; and an outputter that outputs first information including the requested tentative ID or second information indicating that outputting of the first information is not permitted, based on the link-relationship information stored in the second storage.

Since such an information providing apparatus updates the tentative ID at a predetermined timing, it is difficult for a user of the log information to identify an individual. That is, the information providing apparatus can provision the log information with the ensured anonymity.

(2) In the aspect described above, when the receiver receives a request for outputting a tentative ID identified by a first tentative ID as the current ID and a second timing as the one past timing, the information processor may identify a second tentative ID, based on the correspondence-relationship information stored in the first storage, the second tentative ID being a tentative ID given at the second timing, and may determine whether or not to output the first information including the second tentative ID, based on the link-relationship information stored in the second storage, and may update the link-relationship information stored in the second storage when it is determined outputting the first information, and the outputter may output the first information or the second information, based on a result of the determination.

With this arrangement, since the information indicating the relationship of a plurality of tentative IDs corresponding to the same personal ID is output under a certain evaluation, it is possible to reduce the risk of an individual being identified. In turn, upon receiving the information indicating the relationship of the plurality of tentative IDs corresponding to the same personal ID, an external apparatus can analyze the log information.

(3) In the aspect described above, the information processor may determine whether or not the number of third tentative IDs having the correspondence relationship with the second tentative ID is smaller than a predetermined value, the third tentative IDs being included in the link-relationship information stored in the second storage, and the outputter may output the first information when the number of the third tentative IDs is smaller than the predetermined value, and may output the second information when the number of the third tentative IDs is larger than or equal to the predetermined value.

With this arrangement, in accordance with the number of tentative IDs, the information processor can determine whether or not to output the information indicating the relationship of a plurality of tentative IDs corresponding to the same personal ID.

(4) In the aspect described above, the link-relationship information stored in the second storage may be represented as a tree structure in which the requested tentative ID and the current tentative ID serve as nodes; and the information processor may determine whether or not the number of nodes linked to the second tentative ID in the tree structure is smaller than a predetermined value, and the outputter may output the first information when the number of nodes is smaller than the predetermined value, and may output the second information when the number of nodes is larger than or equal to the predetermined value.

With this arrangement, the information processor can determine whether or not to output the information indicating the relationship of a plurality of tentative IDs corresponding to the same personal ID, in accordance with the number of nodes of the tentative IDs.

(5) In the aspect described above, in the correspondence-relationship information stored in the first storage, weights may be assigned to the respective tentative IDs; the link-relationship information stored in the second storage may further include a total value of the weight assigned to the requested tentative ID and the weight assigned to the current tentative ID; and the information processor may determine whether or not a total value of the weights corresponding to the second tentative ID is smaller than a predetermined value, and the outputter may output the first information when the total value of the weights corresponding to the second tentative ID is smaller than the predetermined value, and may output the second information when the total value of the weights corresponding to the second tentative ID is larger than or equal to the predetermined value.

With this arrangement, the information processor can determine whether or not to output the information indicating the relationship of a plurality of tentative IDs corresponding to the same personal ID, considering the weights of the tentative IDs.

(6) In the aspect described above, when the log information indicates viewing history for TV programs of a user corresponding to the personal information, each weight may be assigned in accordance with a type of the TV program indicated by the log information corresponding to each tentative ID.

With this arrangement, for link information for a tentative ID that is given to log information whose degree of uniqueness is higher and with which it is easier to identify an individual, it is less likely that information of a tentative ID linked to that tentative ID is provided.

(7) In the aspect described above, for outputting of the second information, the outputter may further output statistical information about the log information corresponding to a tentative ID other than the second tentative ID.

With this arrangement, when the information indicating the relationship of a plurality of tentative IDs corresponding to the same personal ID is not output, it is possible to perform log-information analysis using the statistical information.

(8) In the aspect described above, the information providing apparatus may further include: an eraser that receives, from an external apparatus when the outputter outputs the first information to an external apparatus, information indicating that the first information is deleted in the external apparatus, and that erases a correspondence relationship regarding the requested tentative ID from the link-relationship information stored in the second storage.

With this arrangement, when the information indicating the relationship of a plurality of tentative IDs corresponding to the same personal ID is erased in the external apparatus, it is possible to reset a criterion for determining whether or not to output the information indicating the relationship of a plurality of tentative IDs corresponding to the same personal ID.

(9) In the aspect described above, the first information may further include the log information corresponding to the requested tentative ID.

With this arrangement, when the log information is erased in the external apparatus, it is possible to reset a criterion for determining whether or not to output the information indicating the relationship of a plurality of tentative IDs corresponding to the same personal ID.

(10) In the aspect described above, the information providing apparatus may further include: a log-information recorder that records the log information and a weight assigned to the log information. The information processor may sum the weight assigned to the log information, each time the first information is output. The tentative ID giver may give a different tentative ID at timing when the summed weight becomes larger than or equal to a predetermined value.

With this arrangement, the information processor can more finely update the tentative ID in accordance with the weights of the log information.

It should be noted that general or specific embodiments may be implemented as a system, a method, an integrated circuit, a computer program, a storage medium such as a computer-readable compact disc read-only memory (CD-ROM), or any selective combination thereof.

For example, it should be noted that general or specific embodiments may be implemented as an information providing method or an information providing system.

Embodiments will be described below in detail with reference to the accompanying drawings. The embodiments described below represent specific examples of the present disclosure. Numerical values, shapes, constituent elements, steps, the order of steps, and so on described in the embodiments below are merely examples and are not intended to limit the present disclosure. Of the constituent elements in the embodiments described below, constituent elements not set forth in the independent claims that represent the broadest concept will be described as optional constituent elements. In all of the embodiments, what are disclosed therein may also be combined together.

(Overall Configuration of Information Providing System)

First, a description will be given of an overall configuration of an information providing system that is common to an information providing system described in each embodiment below. FIGS. 1A to 1C are diagrams each illustrating an overall configuration of an information providing system. FIG. 1A illustrates an overall picture of the information providing system.

A group 5100 is, for example, a company, an entity, a home, or the like, and the scale thereof is not limited. The group 5100 has a plurality of pieces of equipment 5101, including equipment A and equipment B, and a home gateway 5102. The pieces of equipment 5101 include equipment (e.g., a smartphone, a personal computer (PC), and a television (TV)) that can connect to the Internet and equipment (e.g., a light, a washing machine, and a refrigerator) that cannot connection to the Internet on their own. The pieces of equipment 5101 may include equipment that can connect to the Internet via the home gateway 5102 even if it is not capable of connecting to the Internet on its own. The group 5100 includes users 510 who use the pieces of equipment 5101.

A data-center operating company 5110 has a cloud server 5111. The cloud server 5111 is a virtualization server that cooperates with various pieces of equipment through the Internet. The cloud server 5111 mainly manages, for example, big data that is difficult to process with a typical database-management tool or the like. The data-center operating company 5110 performs data management, management of the cloud server 5111, operations of a data center that performs the management, and so on. Details of a service provided by the data-center operating company 5110 are described later.

In this case, the data-center operating company 5110 is not limited to a company that performs only data management, operations of the cloud server 5111, or the like. For example, when an equipment manufacturer that develops and manufactures one piece of the equipment 5101 also performs data management, management of a cloud server 5111, and so on, this equipment manufacturer corresponds to a data-center operating company 5110 (FIG. 1B).

The data-center operating company 5110 is not limited to a single company. For example, when the equipment manufacturer and another management company perform data management and operation of a cloud server 5111 in cooperation with each other or in a shared manner, one of or both the equipment manufacturer and the other management company is/are assumed to correspond to a data-center operating company 5110 (FIG. 1C).

As illustrated in FIG. 1A, a service provider 5120 has a server 5121. The size of the server 5121 as used herein is not limited, and examples of the server 5121 include a memory in a PC or the like. The service provider 5120 may or may not have the server 5121.

In the service described above, the home gateway 5102 is not essential. For example, when the cloud server 5111 performs all data management, the home gateway 5102 may be eliminated. There are also cases in which the pieces of equipment 5101 do not include any equipment that is incapable of connecting to the Internet on their own, as in a case in which all pieces of equipment in a home are connected to the Internet.

Next, a description will be given of a flow of information in the above-described service.

First, the equipment A or B in the group 5100 transmits log information to the cloud server 5111 in the data-center operating company 5110. The cloud server 5111 aggregates the log information of the equipment A or B ((a) in FIG. 1A). The log information as used herein indicates, for example, the operating statuses and the operation date and time of the pieces of equipment 5101. Examples of the log information include a viewing history of a television, video-recording-reservation information of a recorder, the operation date and time of a washing machine, the amount of laundry thereof, the opening/closing date and time of a refrigerator door, and the number of times it was opened/closed. The log information, however, is not limited to those pieces of information and refers to any information that can be obtained from any kind of equipment.

The log information may also be directly supplied from the pieces of equipment 5101 to the cloud server 5111 through the Internet. The log information from the pieces of equipment 5101 may also be temporarily aggregated in the home gateway 5102 and be supplied from the home gateway 5102 to the cloud server 5111.

Next, the cloud server 5111 in the data-center operating company 5110 supplies the aggregated log information to the service provider 5120 in a certain unit of information. The certain unit of information may be a unit with which the data-center operating company 5110 can organize the aggregated information and can supply it to the service provider 5120 or may be a unit requested by the service provider 5120.

The log information may also be provided in a unit other than the certain unit of information, and there are also cases in which the amount of log information changes depending on the situation. The log information is stored in the server 5121 of the service provider 5120, as appropriate ((b) in FIG. 1A).

The service provider 5120 then organizes the log information into information that suits a service to be provided to users, and provides the service to the users. The users to which the information is provided may be the users 510 of the pieces of equipment 5101 or may be outside users 520.

The information that suits the service may be, for example, directly supplied from the service provider 5120 to the users 510 or 520 ((e) or (f) in FIG. 1A). Also, the information that suits the service may be supplied to the users 510 after going through the cloud server 5111 in the data-center operating company 5110 again ((c) and (d) in FIG. 1A). The cloud server 5111 in the data-center operating company 5110 may also organize the log information into information that suits the service to be provided to the users, and may provide the service to the service provider 5120. The users 510 and the users 520 may be different from each other or may be the same.

Each of the pieces of equipment 5101 in the overall configuration described above corresponds to, for example, a user terminal apparatus described in each embodiment described below. Also, the cloud server 5111 corresponds to, for example, a data collecting apparatus, and the server 5121 corresponds to, for example, a data analyzing apparatus.

First Embodiment

An information providing system according to a first embodiment will be described below with reference to the accompanying drawings.

[1.1 Overall Configuration of Information Providing System]

FIG. 2 is a diagram illustrating an overall configuration of the information providing system according to the first embodiment. As illustrated in FIG. 2, an information providing system 10 includes a user terminal apparatus 100, a data collecting apparatus 200, and a data analyzing apparatus 300. Although the information providing system 10 includes one user terminal apparatus 100, one data collecting apparatus 200, and one data analyzing apparatus 300 in the example illustrated in FIG. 2, the information providing system 10 may include a plurality of user terminal apparatuses 100, a plurality of data collecting apparatuses 200, and a plurality of data analyzing apparatuses 300. For example, in the information providing system 10, a plurality of user terminal apparatuses 100 may be connected to one data collecting apparatus 200, or a plurality of data analyzing apparatuses 300 may be connected to one data collecting apparatus 200.

Also, a communication scheme (a connection scheme) between the apparatuses may be any of a wired communication using the Internet or the like, a wireless communication, a dedicated communication, and so on. In the information providing system 10, real-time communication is not essential. For example, the user terminal apparatus 100 may collect a certain amount of log information and transfer the collected log information together to the data collecting apparatus 200. The same also applies to a communication scheme between the data collecting apparatus 200 and the data analyzing apparatus 300.

[1.2 User Terminal Apparatus 100]

Figure 3:
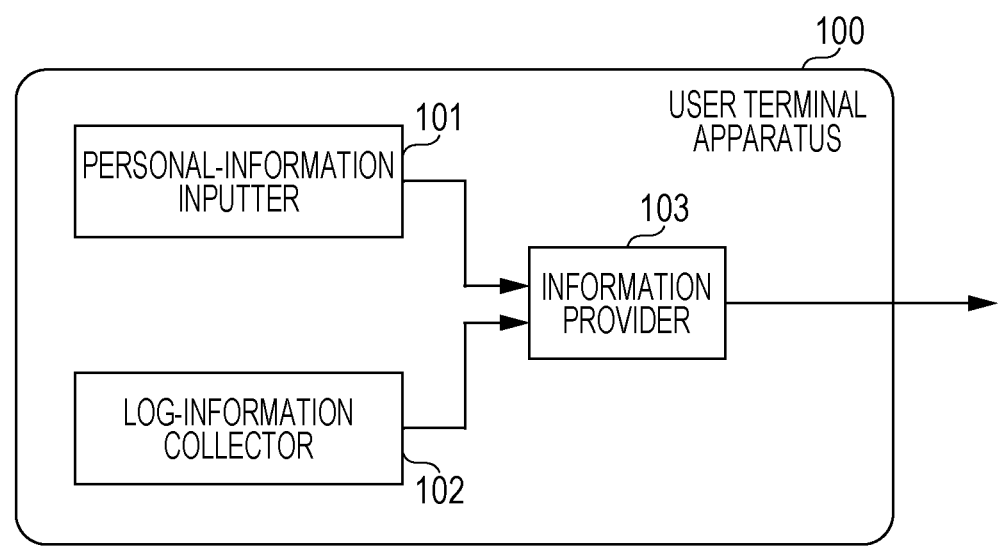
FIG. 3 is a block diagram illustrating the configuration of a user terminal apparatus according to the first embodiment.

First, the configuration of the user terminal apparatus 100 will be described. FIG. 3 is a block diagram illustrating the configuration of the user terminal apparatus 100. The user terminal apparatus 100 includes a personal-information inputter 101, a log-information collector 102, and an information provider 103.

In response to a user input, the user terminal apparatus 100 collects and manages personal information and log information. The user terminal apparatus 100 may collect log information collected and managed by other equipment. The user terminal apparatus 100 transmits the collected personal information and log information to the data collecting apparatus 200. The collection and management of the personal information and the log information by the user terminal apparatus 100 are performed with predetermined consent from a user thereof. Since a procedure for obtaining the consent and so on is not within the scope of the present disclosure, a description thereof is not given herein.

The user terminal apparatus 100 is, specifically, an information communications terminal, such as a portable terminal (a smartphone or tablet terminal) or a personal computer.

[1.2.1 Personal-information Inputter 101]

The personal-information inputter 101 obtains and records, for example, personal information, such as a name, address, and age, input by a user. The user inputs the personal information by using predetermined inputting means, for example, in accordance with an entry form displayed on a display screen of the user terminal apparatus 100. Examples of the predetermined inputting means include a graphical user interface (GUI, such as a display and a touch panel) and a keyboard.

[1.2.2 Log-information Collector 102]

The log-information collector 102 collects and records log information.

The log information is input to, for example, the log-information collector 102 through a sensor over time. When the user terminal apparatus 100 is a portable terminal, the log information is, for example, movement history information (global positioning system (GPS) information) of the user terminal apparatus 100. That is, the sensor in this case is a GPS module.

When the user terminal apparatus 100 is a remote controller for household electrical and electronic equipment (or a portable terminal that operates as a remote controller), the log information may be a remote-controller operation history, such as the time at which the power is on (or off) or user settings of the household electrical and electronic equipment. For example, for operation of a television (TV), the log information may be, for example, information indicating which program was watched and information indicating whether or not a channel was switched in a short time.

The log information may also be, for example, information indicating at which station and when a user got on or off a train. The log information may also be log information of the amount of power consumption in each home, log information of healthcare equipment, such as a weighing scale or sphygmomanometer, history of shopping, log information of World Wide Web (WWW) access, or the like.

Some of the log information includes information obtained by an apparatus other than the user terminal apparatus 100. For example, the aforementioned information indicating at which station and when the user got on or off a train can be obtained via a turnstile and is obtained by a management server for the turnstile.

[1.2.3 Information Provider 103]

The information provider 103 transmits (provides) the personal information and log information, recorded in the user terminal apparatus 100, to the data collecting apparatus 200.

[1.3 Data Collecting Apparatus 200]

Figure 4:
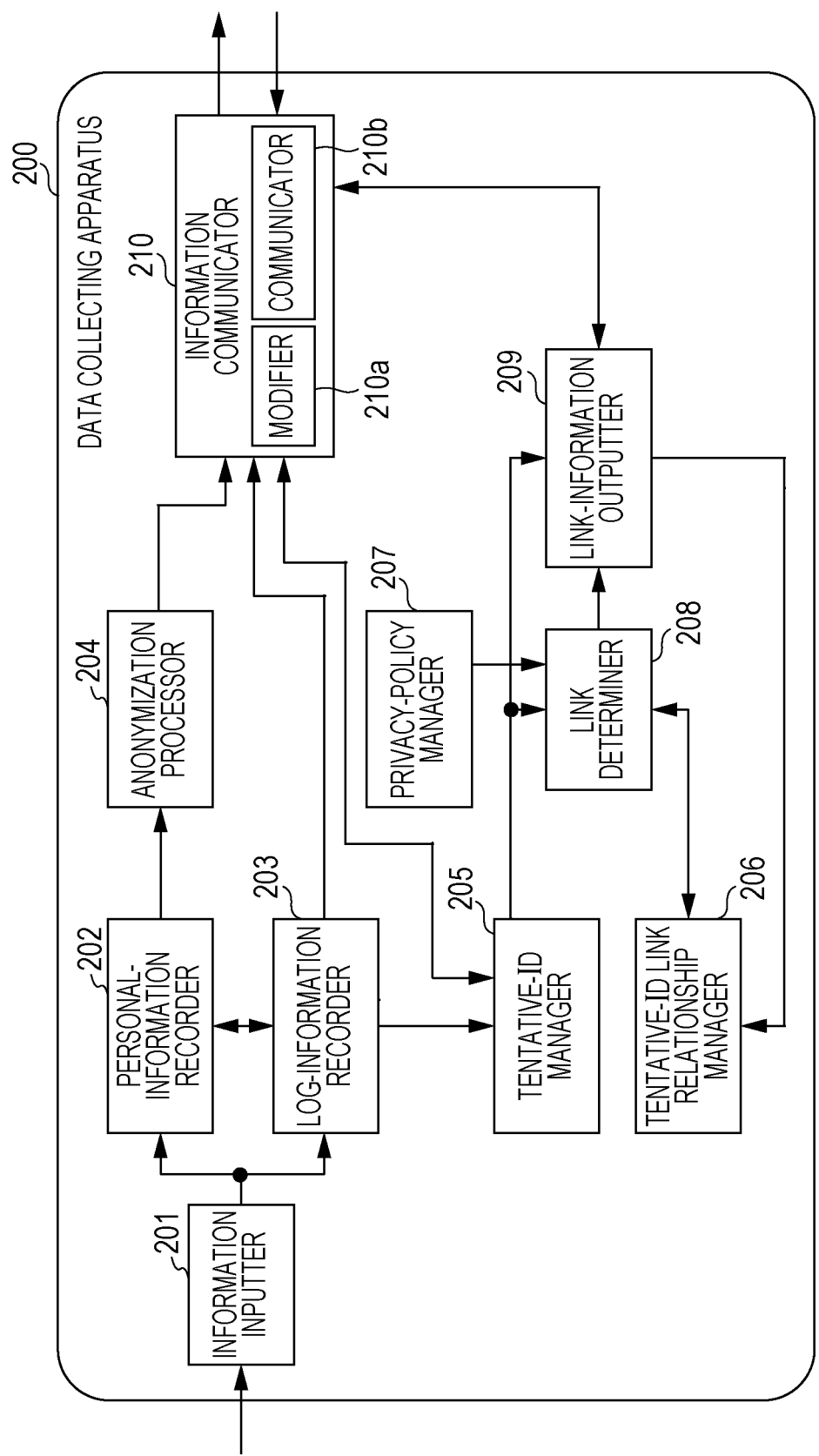
FIG. 4 is a block diagram illustrating the configuration of a data collecting apparatus according to the first embodiment.

Next, the configuration of the data collecting apparatus 200 will be described. FIG. 4 is a block diagram illustrating the configuration of the data collecting apparatus 200. The data collecting apparatus 200 is one example of an information providing apparatus and includes an information inputter 201, a personal-information recorder 202, a log-information recorder 203, and an anonymization processor 204. The data collecting apparatus 200 further includes a tentative-ID manager 205, a tentative-ID link relationship manager 206, a privacy-policy manager 207, a link determiner 208, a link-information outputter 209, and an information communicator 210.

The data collecting apparatus 200 manages the personal information and log information transmitted from the user terminal apparatus 100, modifies the information so that an individual cannot be identified (this modification is hereinafter referred to as "anonymization"), and provides the modified information to the data analyzing apparatus 300 of a third-party organization.

Although the data collecting apparatus 200 is realized as, specifically, a server or a cloud server, it may be realized in any form.

[1.3.1 Information Inputter 201]

The information inputter 201 receives data from the information provider 103 in the user terminal apparatus 100 and separates the received data into the personal information and the log information.

[1.3.2 Personal-information Recorder 202]

The personal-information recorder 202 gives an individual ID (hereinafter referred to as a "personal ID") to the personal information that the information inputter 201 received from the user terminal apparatus 100 and records the resulting personal information. FIG. 5 is a table illustrating one example of data recorded to the personal-information recorder 202.

Data 202a illustrated in FIG. 5 includes, as personal information, attributes, such as names, postal codes (e.g., Zone Improvement Plan (ZIP) codes) indicating registered addresses, ages, and occupations. For example, information about Mr. A who has a personal ID "1" is stored in the first record in the data 202a. The first record shows that Mr. A lives in a region where the postal code is 107-0061, his age is 39, and his occupation is a dancer.

Similarly, the personal information of Mrs. B having a personal ID "2" is stored in the next record. Although the attributes included in the personal information in the data 202a are names, postal codes, ages, and occupations, the attributes may include, for example, genders family compositions, hobbies, and so on, and are not particularly limiting.

Each personal ID may also be pre-given to the personal information by the user terminal apparatus 100.

[1.3.3 Log-Information Recorder 203]

The log-information recorder 203 gives a corresponding personal ID to the log information that the information inputter 201 received from the user terminal apparatus 100 and records the resulting information. FIG. 6 is a table illustrating one example of data recorded in the log-information recorder 203.

A viewing history is recorded in data 203a, illustrated in FIG. 6, as log information. In the data 203a, a user with a personal ID "1" watched a historical drama from ⅓ 9:00 and watched a domestic animation from ⁴/15 10:00. A user with a personal ID "2" watched a foreign film from ⁷/15 9:00. Although FIG. 6 illustrates only representative data of the data 203a, it is assumed that a viewing history is collected each time a user watches a program, and all of the viewing history is recorded in the log-information recorder 203.

The data 203a includes genre information of television programs as the viewing history. The viewing history may include, for example, specific program title names like those shown in electronic program guide (EPG) information and metadata regarding the programs.

Each personal ID may be given to the log information by the user terminal apparatus 100 in advance.

[1.3.4 Anonymization Processor 204]

Upon input of the personal information, the anonymization processor 204 performs modification, such as replacing information that leads to personal identification with more general information, for example, by eliminating that information from the input personal information, and outputs the modified personal information. For example, in the case of personal information like the data 202a illustrated in FIG. 5, the anonymization processor 204 eliminates the name and replaces the age written as 39 years old with the 30 s (i.e., represents the personal information with broader concepts). By doing so, the anonymization processor 204 reduces the individual identifiability (the possibility that individuals are identified).

[1.3.5 Tentative-ID Manager 205]

The tentative-ID manager 205 manages (stores) associations between the personal IDs given to personal information and tentative IDs. Each tentative ID is an identifier that is given to data supplied from the data collecting apparatus 200 to the data analyzing apparatus 300. The tentative ID is randomly and uniquely given so that the relationship with the personal ID cannot be predicted by itself.

FIG. 7 is a table illustrating one example of data stored in the tentative-ID manager 205. In data 205a illustrated in FIG. 7, the tentative ID is updated every month. More specifically, the tentative ID in January 2014 for the user with a personal ID "1" is ID1_1. Also, the tentative ID in February 2014 for the user with the personal ID "1" is ID1_2. That is, the numeral in the first half of each tentative ID indicates a personal ID corresponding to the tentative ID, and the numeral in the last half indicates a month in which the tentative ID is used. The same also applies to the description hereinafter.

[1.3.6 Tentative-ID Link Relationship Manager 206]

The tentative-ID link relationship manager 206 manages (stores) the relationship among the tentative IDs assigned to the log information provided to the data analyzing apparatus 300. The tentative ID is updated at a predetermined timing, even when it corresponds to the same personal ID. Thus, the data analyzing apparatus 300 cannot know the relationship among the tentative IDs.

Figure 8:
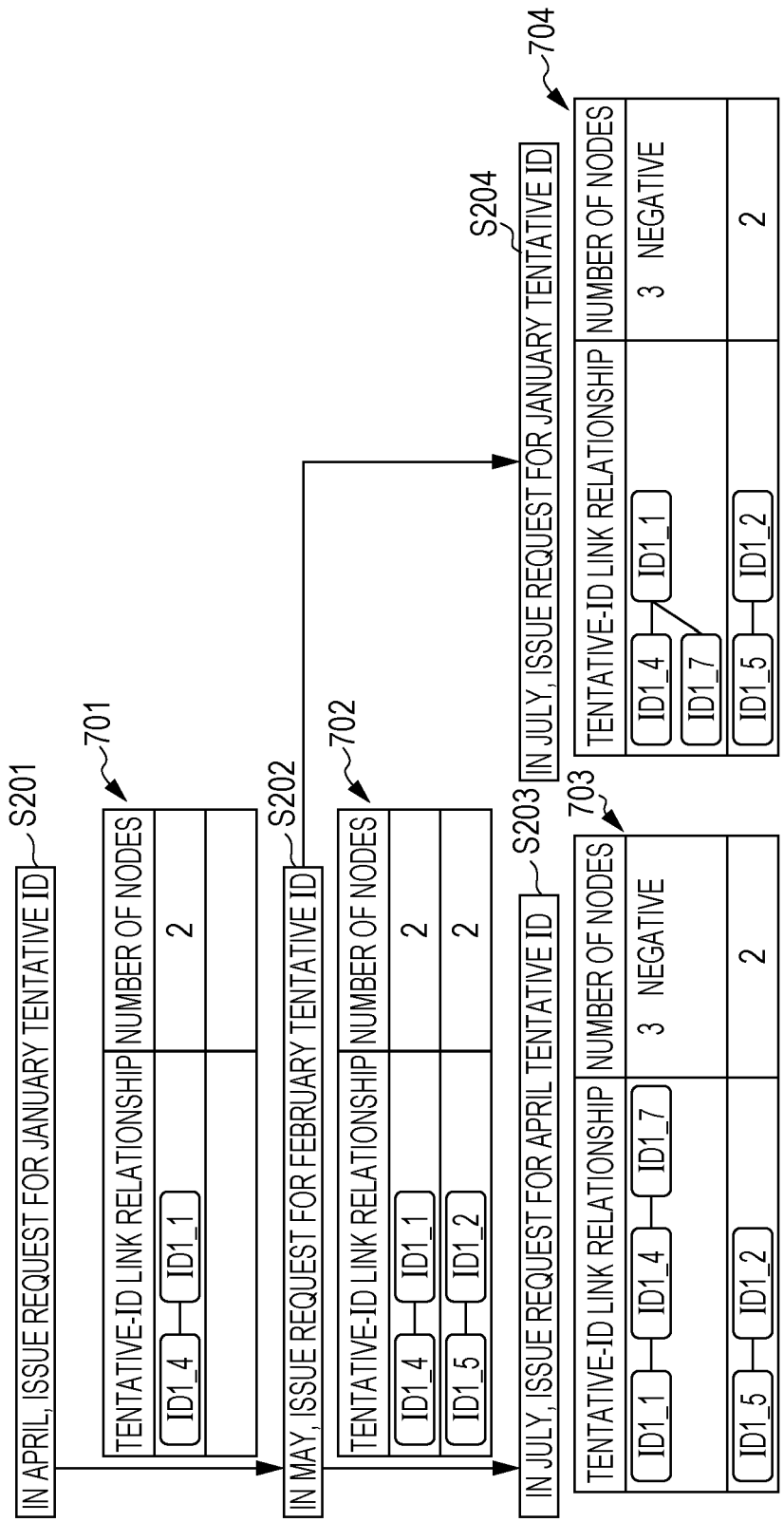
FIG. 8 is a table illustrating tentative-ID link relationships.

However, in the information providing system 10, under a certain restriction, the data collecting apparatus 200 provides, to the data analyzing apparatus 300, information (hereinafter referred to as "link information") indicating that one tentative ID and another tentative ID indicate the same user (correspond to the same personal ID). The tentative-ID link relationship manager 206 then manages the relationship provided to the data analyzing apparatus 300 (this relationship is hereinafter referred to as a "tentative-ID link relationship"). FIG. 8 is a table illustrating tentative-ID link relationships.

A table 701 illustrated in FIG. 8 illustrates a tentative-ID link relationship in April, the tentative-ID link relationship being stored in the tentative-ID link relationship manager 206.

The tentative-ID link relationship is information generated by linking, in response to a request for link information from the data analyzing apparatus 300, tentative IDs corresponding to the request.

For example, when the data analyzing apparatus 300 issues a request for link information indicating a January tentative ID for ID1_4, which is an April tentative ID (S201), a tentative-ID link relationship in which ID1_4 and ID1_1 are linked to each other in a tree structure is generated, as illustrated in the table 701. The number of nodes (2 in the table 701) in the tree structure included in the tentative-ID link relationship is also stored in the tentative-ID link relationship manager 206.

Similarly, when the data analyzing apparatus 300 issues a request for link information indicating a tentative ID for February for ID1_5, which is a May tentative ID (S202), a tentative-ID link relationship in which ID1_5 and ID1_2 are linked to each other is generated, as illustrated in a table 702. Thus, in the table 702, the tentative-ID link relationship in which the tentative IDs ID1_5 and ID1_2 are linked to each other is added to the contents of the table 701.

Such a tentative-ID link relationship is information that differs from one data analyzing apparatus 300 to another. That is, when the number of data analyzing apparatuses 300 is two or more, a plurality of tables is also prepared.

Details of FIG. 8 are described below as a detailed operation of the information providing system 10.

[1.3.7 Privacy-Policy Manager 207]

The privacy-policy manager 207 manages (stores) the numbers (the upper-limit number or the upper-limit value) of tentative IDs in a tentative-ID link relationship, the numbers serving as a criterion for determining whether or not to output the link information. The link determiner 208, which is described below, determines whether or not to provide the link information, in accordance with the number of tentative IDs included in the tentative-ID link relationship. For example, in a case in which the link determiner 208 permits outputting of link information when two tentative IDs are linked in a tentative-ID link relationship and does not permit outputting of link information when three tentative IDs are linked in a tentative-ID link relationship, "3" (negative) is stored in the privacy-policy manager 207. When the number of user terminal apparatuses 100 that are connected is two or more, the numbers of tentative IDs may be the same for all of the user terminal apparatuses 100 or may be arbitrarily set for each of the user terminal apparatuses 100. When the tentative IDs are linked in a tree structure, the number of tentative IDs can be restated as the number of nodes.

[1.3.8 Link Determiner 208]

Upon receiving a request for link information from the data analyzing apparatus 300, the link determiner 208 determines whether or not the link information is to be provided. More specifically, by referring to the tentative-ID link relationship stored in the tentative-ID link relationship manager 206, the link determiner 208 calculates the number of nodes when a link of a tentative ID corresponding to the request is added. When the calculation result is smaller than an upper-limit number stored in the privacy-policy manager 207, the link-information outputter 209 provides the link information to the data analyzing apparatus 300. When the calculation result is larger than or equal to the upper-limit number stored in the privacy-policy manager 207, the link-information outputter 209 rejects providing the link information to the data analyzing apparatus 300.

[1.3.9 Link-Information Outputter 209]

The link-information outputter 209 generates link information corresponding to a request from the data analyzing apparatus 300. For example, when a request for a January tentative ID for ID1_4 is received from the data analyzing apparatus 300, and the link determiner 208 permits providing the link information, the link-information outputter 209 generates link information in which ID1_1 is associated with ID1_4 and provides the generated link information to the data analyzing apparatus 300 via the information communicator 210 (a communicator 210b described below).

[1.3.10 Information Communicator 210]

The information communicator 210 reads the personal information recorded in the personal-information recorder 202 and the log information recorded in the log-information recorder 203, modifies the read information, and transmits the modified information to the data analyzing apparatus 300. FIG. 9 illustrates an example of data transmitted by the information communicator 210. More specifically, the information communicator 210 includes a modifier 210a that performs information modification, involving giving a tentative ID, and the communicator 210b that transmits the modified information. When giving a tentative ID, the modifier 210a stores the association between the tentative ID and a personal ID in the tentative-ID manager 205.

For example, (1) in FIG. 9 represents data in which ID1_1 is given to viewing-history information (time and a viewing history) of the user with a personal ID "1" as a tentative ID. The data (1) in FIG. 9 includes anonymized personal information (age: in the 30 s), that is, personal information represented with a broader concept, output from the anonymization processor 204. The viewing-history information included in the data (1) in FIG. 9 indicates that the user watched a historical drama at 1/3 9:00. The viewing-history information is one example of the log information.

(2) in FIG. 9 represents data in which ID1_1, which is the same tentative ID as that in the data (1) is given to the viewing-history information of the user with the personal ID "1". The viewing-history information included in the data (2) in FIG. 9 indicates that this user watched a news program at 1/4 7:00.

(3) in FIG. 9 represents data in which ID1_4 is given to the viewing-history information of the user with the personal ID "1" as a tentative ID. The viewing-history information included in the data (3) in FIG. 9 indicates that this user watched a domestic animation at 4/15 10:00.

The above-described data ((1) and (2) in FIG. 9) to which ID1_1 is given and the data ((3) in FIG. 9) to which ID1_4 is given are data of the same user. However, the data analyzing apparatus 300 can determine that these pieces of data are the same in that the ages are in the 30 s, but cannot know whether or not these pieces of data are data of the same user.

(4) in FIG. 9 is link information that the information communicator 210 transmits in response to a request from the data analyzing apparatus 300. More specifically, (4) in FIG. 9 is link information in which ID1_1, which is a January tentative ID of the user with the personal ID "1", is associated with ID1_4, which is an April tentative ID. With such link information, when the data analyzing apparatus 300 receives the link information, it can associate the log information for January for the same user as the user of ID1_4.

(5) in FIG. 9 is data in which ID1_5 is given to the viewing-history information of the user with the personal ID "1" as a tentative ID. The viewing-history information included in the data (5) in FIG. 9 indicates that this user watched a cooking program at 7/15 12:15. The data to which ID1_1 is given and the data to which ID1_5 is given are data of the same user. However, the data analyzing apparatus 300 can determine that these pieces of data are the same in that the ages are in the 30 s, but cannot know whether or not these pieces of data are data of the same user.

(6) in FIG. 9 is link information in which ID1_2, which is a February tentative ID of the user with the personal ID "1", is associated with ID1_5, which is a May tentative ID.

The communicator 210b in the information communicator 210 also receives a request for link information which is transmitted by the data analyzing apparatus 300.

[1.4 Data Analyzing Apparatus 300]

Figure 10:
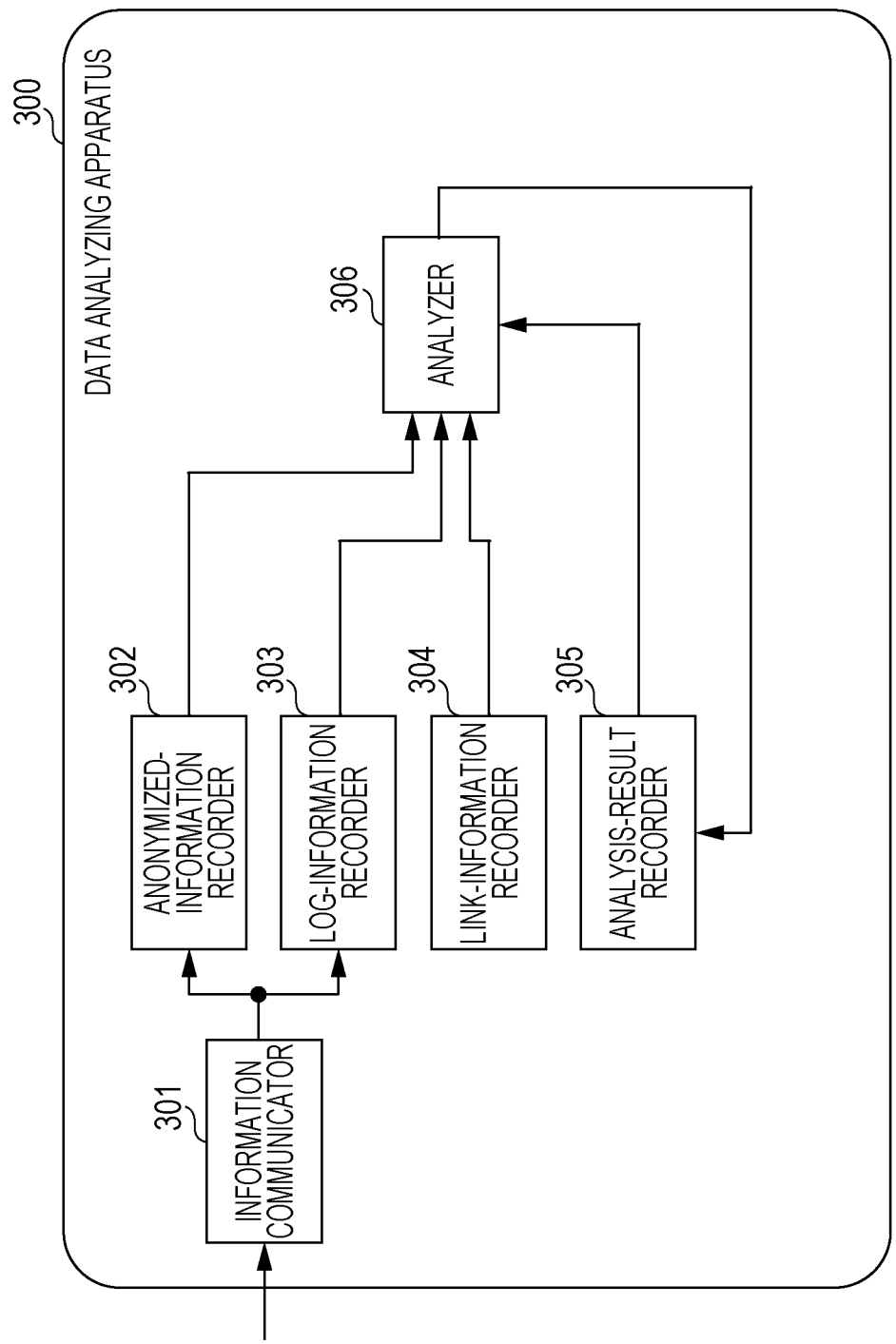
FIG. 10 is a block diagram illustrating the configuration of a data analyzing apparatus according to the first embodiment.

Next, a description will be given of the configuration of the data analyzing apparatus 300. FIG. 10 is a block diagram illustrating the configuration of the data analyzing apparatus 300. The data analyzing apparatus 300 includes an information communicator 301, an anonymized-information recorder 302, a log-information recorder 303, a link-information recorder 304, an analysis-result recorder 305, and an analyzer 306.

By using data received from the data collecting apparatus 200, the data analyzing apparatus 300 analyzes what type of preference a user has. As described above, the tentative ID is updated in a month. Thus, the data analyzing apparatus 300 can determine the preference and so on of a user identified with a tentative ID by collecting log information for one month and performing analysis, involving collaborative filtering or the like. By using the data of users having the same tendency in accordance with results of such analysis, the data analyzing apparatus 300 can recommend a program that suits the preference of the users.

[1.4.1 Information Communicator 301]

The information communicator 301 receives data from the data collecting apparatus 200 (the information communicator 210) and separates the data into anonymized personal information and log information. The information communicator 301 transmits a request for link information to the data collecting apparatus 200 (the communicator 210b) and receives the link information from the data collecting apparatus 200 (the communicator 210b).

[1.4.2 Anonymized-Information Recorder 302]

The anonymized-information recorder 302 records anonymized personal information (anonymized information), output from the information communicator 301, in conjunction with a tentative ID. The anonymized personal information is, for example, information indicating that the age is in the 30 s.

[1.4.3 Log-Information Recorder 303]

The log-information recorder 303 records the log information, output from the information communicator 301, in conjunction with a tentative ID.

[1.4.4 Link-Information Recorder 304]

The link-information recorder 304 records the link information that the information communicator 301 receives from the data collecting apparatus 200. The link information is, for example, information indicating that a January tentative ID for ID1_4, which is an April tentative ID of the user with the personal ID "1", is ID1_1. The link information is recorded, for example, in a data form similar to that of the data stored in the tentative-ID link relationship manager 206 in the data collecting apparatus 200, but may be recorded in any form.

[1.4.5 Analysis-Result Recorder 305]

The analysis-result recorder 305 records a result of analysis performed by the analyzer 306, which is described below. The result of the analysis is not an individual piece of log information, but is information (statistical information) that has been subjected to statistical processing.

[1.4.6 Analyzer 306]

The analyzer 306 performs information analysis by using anonymized information recorded in the anonymized-information recorder 302, the log information recorded in the log-information recorder 303, the link information recorded in the link-information recorder 304, and past analysis results. The analyzer 306 performs, for example, information analysis to determine the number of users who have watched programs in a certain genre ten times or more in a month. By performing information analysis, the analyzer 306 also determine in what type of genre and how many times a certain user has watched programs.

[1.5 Operation of Information Providing System 10]

[1.5.1 Overview of Operation]

Figure 11:
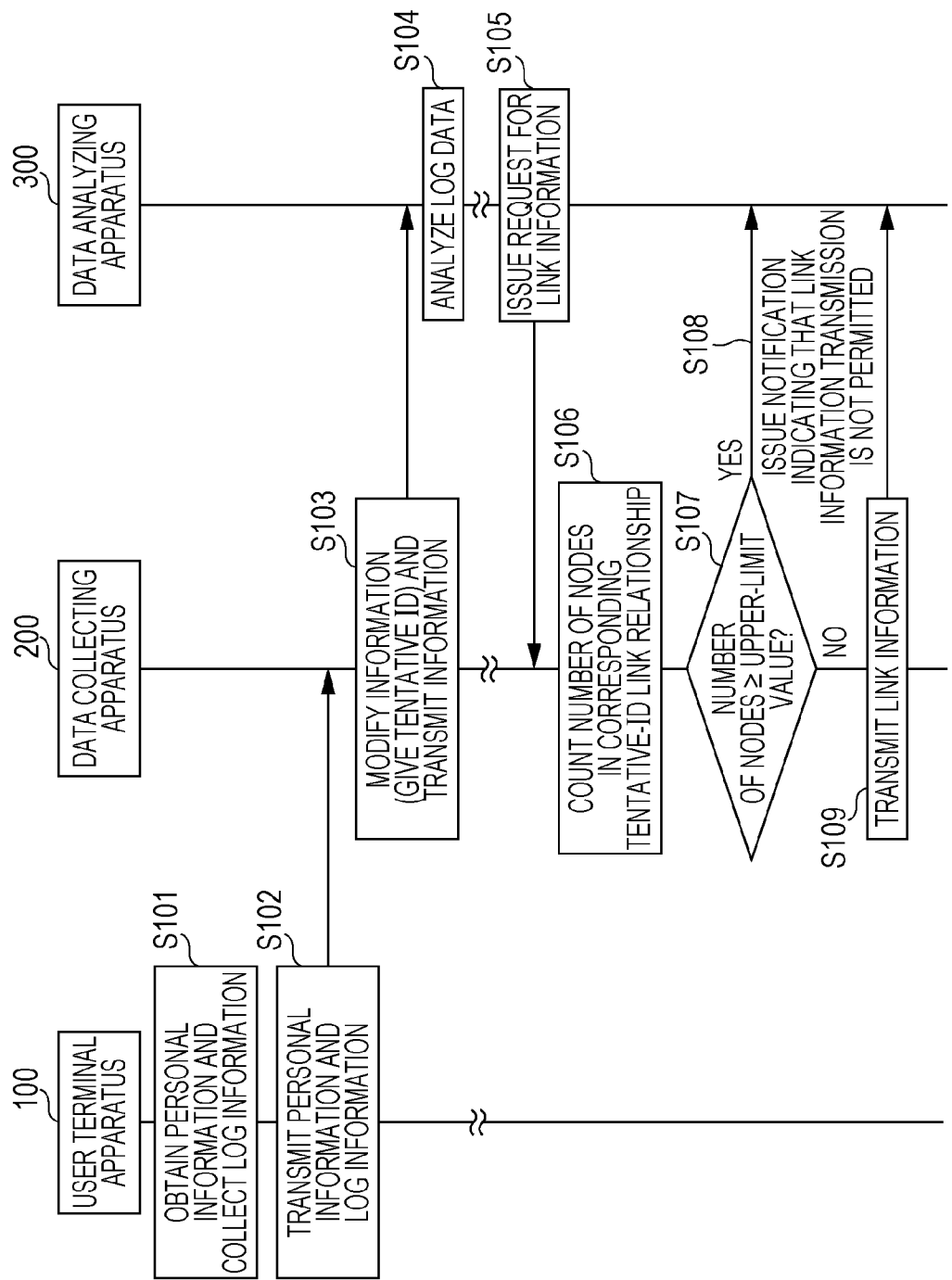
FIG. 11 is a sequence diagram illustrating the operation of the information providing system according to the first embodiment.

Now, a description will be given of an overview of the operation of the information providing system 10. FIG. 11 is a sequence diagram illustrating the operation of the information providing system 10. FIGS. 12A to 12D are schematic diagrams illustrating APIs used in the operation of the information providing system 10.

First, the user terminal apparatus 100 obtains personal information and collects log information (S101). The personal information is, specifically, obtained and recorded by the personal-information inputter 101. Specifically, the log information is collected and recorded by the log-information collector 102.

Next, the information provider 103 in the user terminal apparatus 100 transmits (provides) data including the personal information and the log information to the data collecting apparatus 200 (S102).

The data collecting apparatus 200 receives the data from the information provider 103 in the user terminal apparatus 100 and modifies the received data and transmits the modified data to the data analyzing apparatus 300 (S103). More specifically, the personal-information input to the information inputter 201 is given a personal ID by the personal-information recorder 202 and is subjected to anonymization processing performed by the anonymization processor 204. The log information input to the information inputter 201 is given a personal ID by the log-information recorder 203. The modifier 210a then gives a tentative ID to the data including the log information and the anonymized personal information, and the communicator 210b transmits the data to which the tentative ID is given.

FIG. 12A illustrates the API (data structure) of the data transmitted in this case. In each of the API formats illustrated in FIGS. 12A to 12D, the third field from the beginning is a command field. For example, the description "history transmission" in the third field from the beginning in FIG. 12A means a history transmission command, and the description "request command" in the third field from the beginning in FIG. 12B means a request command. Similarly, the description "negative response" in the third field in FIG. 12C means a negative-response command, and the description "affirmative response" in the third field from the beginning in FIG. 12D means an affirmative-response command.

As illustrated in FIG. 12A, the data includes the ID of the data collecting apparatus 200 (the ID of a transmission source), the ID of the data analyzing apparatus 300 (the ID of a transmission destination), and an identifier indicating that this data is a history transmission command. The data further includes a tentative ID, an attribute (an anonymized age, such as "in the 30 s"), time, and a viewing history (viewing-history information=log information).

Upon receiving such data, the information communicator 301 in the data analyzing apparatus 300 performs analysis by using the received data and an analysis result (statistical information) already recorded in the analysis-result recorder 305 (S104). An example of the analysis has already been described above. After S104, it is assumed that the log information is transmitted to the data analyzing apparatus 300. The tentative ID is updated every month.

The information communicator 301 in the data analyzing apparatus 300 transmits a request for the link information to the communicator 210b in the data collecting apparatus 200 (S105). Specific details of the request are that the user wants to know a January tentative ID for ID1_4, which is an April tentative ID.

FIG. 12B illustrates the API of the data transmitted in this case. As illustrated in FIG. 12B, the data includes the ID of the data analyzing apparatus 300 (the ID of a transmission source), the ID of the data collecting apparatus 200 (the ID of a transmission destination), and an identifier indicating that this data is a request (a request command) for link information. The data further includes a session ID, a tentative ID (in this case, ID1_4), and a period (in this case, January). The session ID is an ID for disguising one piece of data from other data when the three pieces of data in FIGS. 12B to 12D are regarded as a series of sessions.

When the communicator 210b receives the request, the link determiner 208 counts the number of nodes included in the tentative-ID link relationship corresponding to the request (S106). More specifically, the link determiner 208 refers to the data 205a in the tentative-ID manager 205 to determine that the January tentative ID corresponding to ID1_4 is ID1_1. The link determiner 208 then refers to the tentative-ID link relationship manager 206 to check whether or not there is a tentative-ID link relationship including the tentative ID ID1_1.

When there is a tentative-ID link relationship including ID1_1, the link determiner 208 further links ID1_4 to the tentative-ID link relationship and then counts the number of nodes included in the tentative-ID link relationship. When there is no tentative-ID link relationship including tentative ID1_1, the link determiner 208 newly generates a tentative-ID link relationship in a tree structure in which ID1_4 and ID1_1 are linked to each other and counts the number of nodes included in the generated tentative-ID link relationship.

The link determiner 208 then determines whether or not the number of nodes is larger than or equal to an upper-limit value stored in the privacy-policy manager 207 (S107).

If the number of nodes is larger than or equal to the upper-limit value (YES in S107), provision of the link information to the data analyzing apparatus 300 causes a risk of the individual being identified. Accordingly, the link-information outputter 209 issues, to the data analyzing apparatus 300 via the communicator 210b, a notification indicating that link-information transmission is not permitted (S108).

The API of the data (notification) transmitted in this case is illustrated in FIG. 12C. As illustrated in FIG. 12C, the data includes the ID of the data collecting apparatus 200 (the ID of a transmission source), the ID of the data analyzing apparatus 300 (the ID of a transmission destination), an identifier indicating that this data indicates that link-information transmission is not permitted (a negative-response command), and a session ID.

On the other hand, if the number of nodes is smaller than the upper-limit value (NO in S107), the link-information outputter 209 generates link information (i.e., information in which ID1_4 and ID1_1 are associated with each other) and transmits the generated link information to the data analyzing apparatus 300 via the communicator 210b (S109).

The API of the data (notification) transmitted in this case is illustrated in FIG. 12D. As illustrated in FIG. 12D, the data includes the ID of the data collecting apparatus 200 (the ID of a transmission source), the ID of the data analyzing apparatus 300 (the ID of a transmission destination), an identifier indicating that this data indicates that link-information transmission is permitted (an affirmative-response command), a session ID, a tentative ID (in this case, ID1_4), and a corresponding tentative ID (in this case, ID1_1).

[1.5.2 Specific Example Operation (Determination Using Number of Nodes) of Link Determiner 208]

Next, an operation of the link determiner 208 will be described in detail with reference to FIG. 8.

In the example illustrated in FIG. 8, the tentative ID is updated (changed) every month. It is also assumed that the upper-limit value for the number of nodes, the value being stored in the privacy-policy manager 207, is 3. It is further assumed that no tentative-ID link relationship is initially stored in the tentative-ID link relationship manager 206.

First, in April, the data analyzing apparatus 300 issues a request for a January tentative ID (S201). More specifically, the information communicator 301 in the data analyzing apparatus 300 issues a request for link information indicating a January tentative ID for ID1_4, which is an April tentative ID. Such a request is issued, for example, when the user of the data analyzing apparatus 300 desires to perform analysis on both the log information in April and the log information in January together, the log information being obtained by the user terminal apparatus 100. Since the log information is already recorded in the log-information recorder 303, only the link information is requested in step S201.

In response to the request, the link determiner 208 in the data collecting apparatus 200 refers to the associations in the tentative-ID manager 205 to identify ID1_1, which is the January tentative ID. Then, by referring to the tentative-ID link relationship manager 206, the link determiner 208 searches for a tentative-ID link relationship including ID1_1 and recognizes that there is no such a tentative-ID link relationship.

Accordingly, the link determiner 208 generates a tentative-ID link relationship in which the identified ID1_1 is linked to ID1_4 in a tree structure and calculates the number of nodes included in the generated tentative-ID link relationship. The number of nodes in this case is 2, which is smaller than the upper-limit value "3" for the number of nodes. Thus, the link determiner 208 determines that there is no problem with providing the link information, and the link-information outputter 209 transmits, to the data analyzing apparatus 300 via the communicator 210b, the link information in which ID1_4 and ID1_1 are associated with each other. The link determiner 208 stores the generated tentative-ID link relationship in the tentative-ID link relationship manager 206, so that the data in the tentative-ID link relationship manager 206 takes a form as in the table 701.

Next, in May, the data analyzing apparatus 300 issues a request for a February tentative ID (S202). More specifically, the information communicator 301 in the data analyzing apparatus 300 issues a request for link information indicating a February tentative ID for ID1_5, which is a May tentative ID.

In response to the request, the link determiner 208 in the data collecting apparatus 200 refers to the associations in the tentative-ID manager 205 to identify ID1_2, which is the February tentative ID. Then, by referring to the tentative-ID link relationship manager 206, the link determiner 208 searches for a tentative-ID link relationship including ID1_2 and recognizes that there is no such a tentative-ID link relationship.

Accordingly, the link determiner 208 generates a tentative-ID link relationship in which the identified ID1_2 is linked to ID1_5 in a tree structure and calculates the number of nodes included in the generated tentative-ID link relationship. The number of nodes in this case is 2, which is smaller than the upper-limit value "3" for the number of nodes. Thus, the link determiner 208 determines that there is no problem with providing the link information, and the link-information outputter 209 transmits, to the data analyzing apparatus 300 via the communicator 210b, the link information in which ID1_5 and ID1_2 are associated with each other. The link determiner 208 adds (stores) the generated tentative-ID link relationship to (in) the tentative-ID link relationship manager 206, so that the data in the tentative-ID link relationship manager 206 takes a form as in the table 702.

Next, in July, the data analyzing apparatus 300 issues a request for an April tentative ID (S203). More specifically, the information communicator 301 in the data analyzing apparatus 300 issues a request for link information indicating the April tentative ID for ID1_7, which is a July tentative ID.

In response to the request, the link determiner 208 in the data collecting apparatus 200 refers to the associations in the tentative-ID manager 205 to identify ID1_4, which is the April tentative ID. Then, by referring to the tentative-ID link relationship manager 206, the link determiner 208 searches for a tentative-ID link relationship including ID1_4. In this case, the tentative-ID link relationship in which ID1_4 and ID1_1 are linked to each other, the tentative-ID link relationship being generated in step S201, is already stored in the tentative-ID link relationship manager 206.

In this case, if ID1_7 is further linked to ID1_4 in the tentative-ID link relationship in which ID1_4 and ID1_1 are linked to each other, as illustrated in a table 703, the number of nodes in the tentative-ID link relationship is 3, which is larger than or equal to the upper-limit value "3" for the number of nodes. Thus, the link determiner 208 determines that there is a problem with providing the link information, and the link-information outputter 209 issues, to the data analyzing apparatus 300, a notification indicating that the link information cannot be transmitted. This notification is issued via the information communicator 210 (the communicator 210b) and the information communicator 301.

In this case, although the data in the tentative-ID link relationship manager 206 is not updated from the state in the table 702 (is not changed to the state in the table 703), the data may be updated.

After step S202, there is a case in which, in July, the data analyzing apparatus 300 issues a request for the January tentative ID (S204), that is, there is a case in which the information communicator 301 in the data analyzing apparatus 300 issues a request for link information indicating the January tentative ID for ID1_7, which is the July tentative ID.

In this case, the link determiner 208 in the data collecting apparatus 200 refers to the associations in the tentative-ID manager 205 to identify ID1_1, which is the January tentative ID. Then, by referring to the tentative-ID link relationship manager 206, the link determiner 208 searches for a tentative-ID link relationship including ID1_1. The tentative-ID link relationship in which ID1_4 and ID1_1 are linked to each other, the tentative-ID link relationship being generated in step S201, is already stored in the tentative-ID link relationship manager 206.

In this case, if ID1_7 is further linked to ID1_1 in the tentative-ID link relationship in which ID1_4 and ID1_1 are linked to each other, as illustrated in a table 704, the number of nodes in tentative-ID link relationship is 3, which is larger than or equal to the upper-limit value "3" for the number of nodes. Thus, the link determiner 208 determines that there is a problem with providing the link information, and the link-information outputter 209 issues, to the data analyzing apparatus 300, a notification indicating that the link information cannot be transmitted. This notification is issued via the information communicator 210 (the communicator 210b).

[1.5.3 Specific Example Operation (Determination Using Total of Weights) of Link Determiner 208]

Next, a description will be given of another example operation of the link determiner 208.

In the example operation described above, the upper-limit value for the number of nodes (the number of links in a tree structure in a tentative-ID link relationship) is stored in the privacy-policy manager 207. In contrast, in an example operation described below, the link determiner 208 determines whether or not the link relationship can be output, based on whether or not the total of weights of tentative IDs included in a tentative-ID link relationship is larger than or equal to an upper-limit value stored in the privacy-policy manager 207. In connection with the determination, the tentative IDs in the data (associations) stored in the tentative-ID manager 205 have been weighted. FIG. 13 is a table illustrating one example of the weighted data stored in the tentative-ID manager 205.

As illustrated in FIG. 13, the tentative IDs in data 205b stored in the tentative-ID manager 205 are weighted. For generating a tentative-ID link relationship or for further linking a tentative ID to a tentative-ID link relationship, the link determiner 208 totals such weights and compares the total with the upper-limit value stored in the privacy-policy manager 207.

Figure 14:
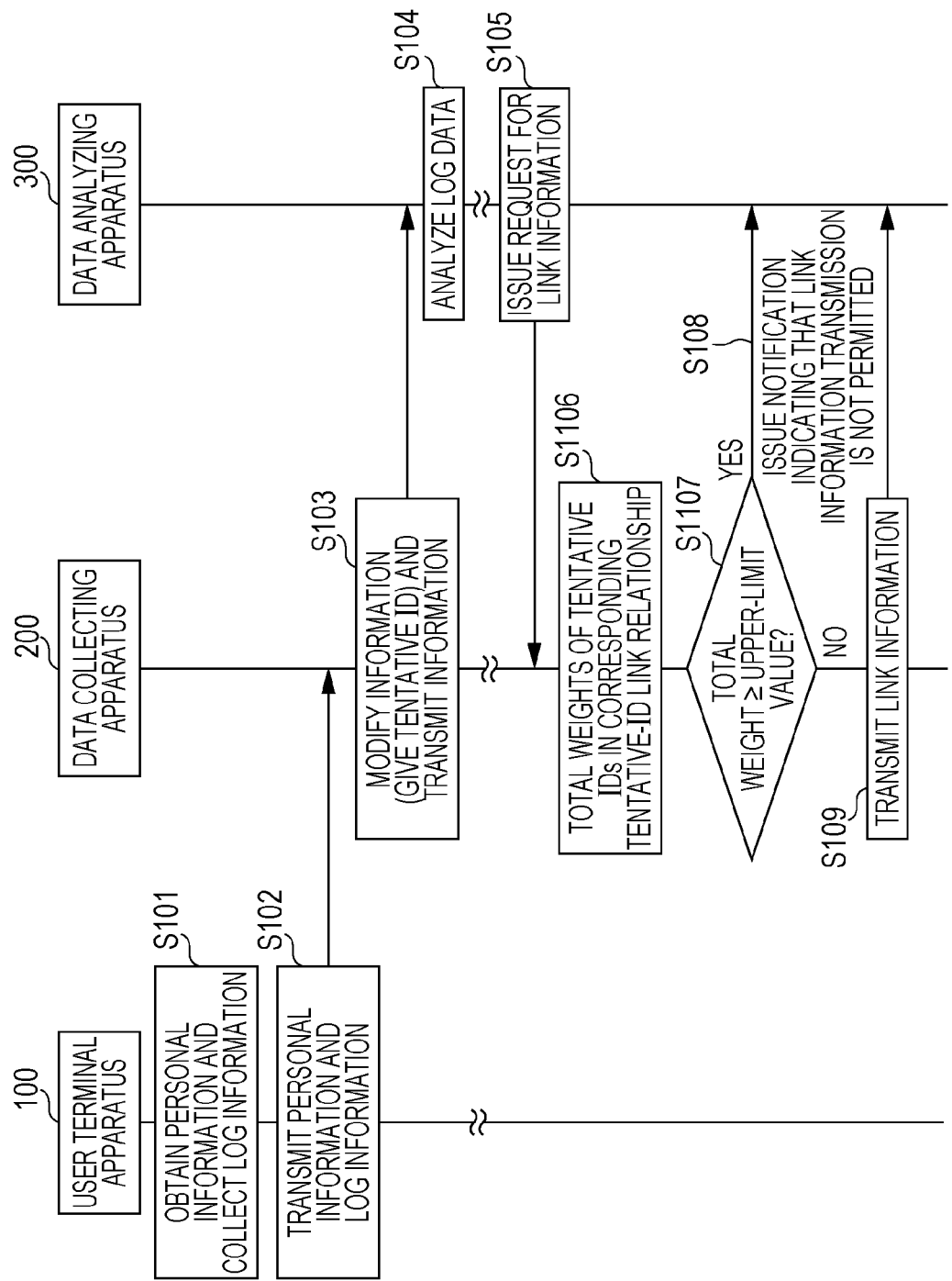
FIG. 14 is a sequence diagram of an operation using weights of tentative IDs in the information providing system.

FIG. 14 is a sequence diagram of an operation using the weights of tentative IDs in the information providing system 10. In the sequence diagram illustrated in FIG. 14, step S1106 is provided in place of step S106 in the sequence diagram in FIG. 11, and step S1107 is provided in place of step S107 in FIG. 11. These differences will now be described.

When the communicator 210b receives the request, the link determiner 208 totals the weights of tentative IDs included in a tentative-ID link relationship corresponding to the request (S1106). More specifically, the link determiner 208 refers to the data 205b in the tentative-ID manager 205 to identify that the January tentative ID corresponding to ID1_4 is ID1_1. The link determiner 208 refers the tentative-ID link relationship manager 206 to check whether or not there is a tentative-ID link relationship including ID1_1.

When there is a tentative-ID link relationship including the tentative ID ID1_1, the link determiner 208 further links ID1_4 to the tentative-ID link relationship and then totals the weights of the tentative IDs included in the resulting tentative-ID link relationship. When there is no tentative-ID link relationship including the tentative ID1_1, the link determiner 208 newly generates a tentative-ID link relationship in a tree structure in which ID1_4 and ID1_1 are linked to each other, and totals the weights of the tentative IDs included in the generated tentative-ID link relationship.

The link determiner 208 then determines whether or not the total weight is larger than or equal to the upper-limit value stored in the privacy-policy manager 207 (S1107).

If the total weight is larger than or equal to the upper-limit value (YES in S1107), the link-information outputter 209 issues, to the data analyzing apparatus 300 via the communicator 210b, a notification indicating that the link information transmission is not permitted (S108).

On the other hand, if the total weight is smaller than the upper-limit value (NO in S1107), the link-information outputter 209 generates link information and transmits the generated link information to the data analyzing apparatus 300 via the communicator 210b (S109).

Figure 15:
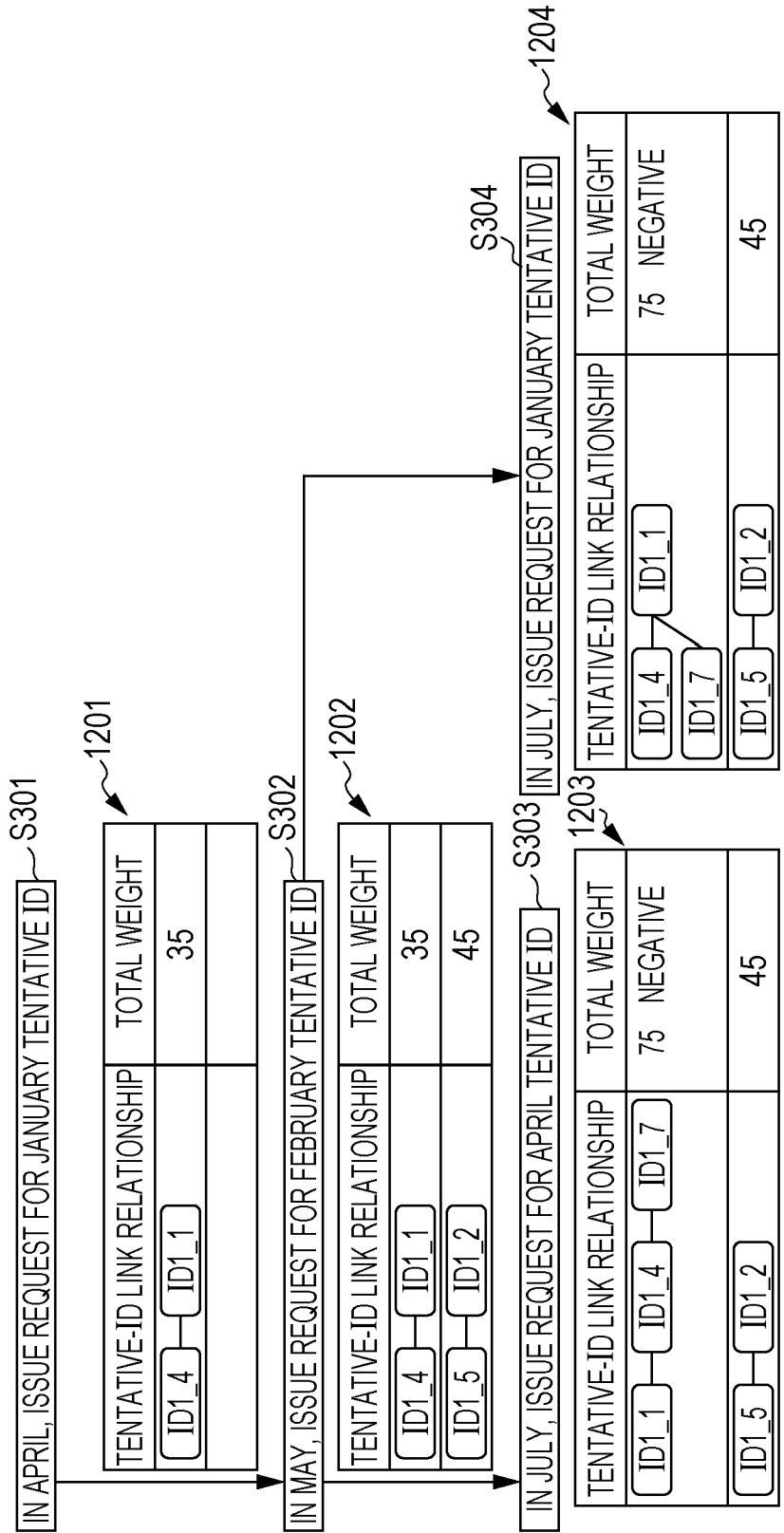
FIG. 15 illustrates a specific example of an operation using the weights of tentative IDs in the information providing system.

Such an operation of the link determiner 208 will be described below in more detail with reference to FIG. 15. FIG. 15 illustrates a specific example of an operation using the weights of tentative IDs in the information providing system 10.

In the example illustrated in FIG. 15, the tentative ID is updated (changed) every month. It is also assumed that the upper-limit value for the total weight, the upper-limit value being stored in the privacy-policy manager 207, is 50. It is further assumed that no tentative-ID link relationship is initially stored in the tentative-ID link relationship manager 206.

First, in April, the data analyzing apparatus 300 issues a request for a January tentative ID (S301). More specifically, the information communicator 301 in the data analyzing apparatus 300 issues a request for link information indicating a January tentative ID for ID1_4, which is an April tentative ID. Such a request is issued, for example, when the user of the data analyzing apparatus 300 desires to perform analysis on both the log information in April and the log information in January together, the log information being obtained by the user terminal apparatus 100.

In response to the request, the link determiner 208 in the data collecting apparatus 200 refers to the associations in the tentative-ID manager 205 to identify ID1_1, which is the January tentative ID. Then, by referring to the tentative-ID link relationship manager 206, the link determiner 208 searches for a tentative-ID link relationship including ID1_1 and recognizes that there is no such a tentative-ID link relationship.

Accordingly, the link determiner 208 generates a tentative-ID link relationship in which the identified ID1_1 is linked to ID1_4 in a tree structure and calculates the total of the weights of the tentative IDs included in the generated tentative-ID link relationship. During the calculation of the total weight, the data 205b in the tentative-ID manager 205 illustrated in FIG. 13 is referred to. Specifically, the total weight is 35, which is smaller than the upper-limit value "50". Thus, the link-information outputter 209 transmits, to the data analyzing apparatus 300, the link information in which ID1_4 and ID1_1 are associated with each other. The data in the tentative-ID link relationship manager 206 in this case takes, for example, a form as in a table 1201.

Next, in May, the data analyzing apparatus 300 issues a request for a February tentative ID (S302). More specifically, the information communicator 301 in the data analyzing apparatus 300 issues a request for link information indicating a February tentative ID for ID1_5, which is a May tentative ID.

In response to the request, the link determiner 208 in the data collecting apparatus 200 refers to the associations in the tentative-ID manager 205 to identify ID1_2, which is the February tentative ID. Then, by referring to the tentative-ID link relationship manager 206, the link determiner 208 searches for a tentative-ID link relationship including ID1_2 and recognizes that there is no such a tentative-ID link relationship.

Accordingly, the link determiner 208 generates a tentative-ID link relationship in which the identified ID1_2 is linked to ID1_5 in a tree structure and calculates the total of the weights of the tentative IDs included in the generated tentative-ID link relationship. The total weight in this case is 45, which is smaller than the upper-limit value "50". Thus, the link-information outputter 209 transmits, to the data analyzing apparatus 300, the link information in which ID1_5 and ID1_2 are associated with each other. The data in the tentative-ID link relationship manager 206 in this case takes, for example, a form as in a table 1202.

Next, in July, the data analyzing apparatus 300 issues a request for an April tentative ID (S303). More specifically, the information communicator 301 in the data analyzing apparatus 300 issues a request for link information indicating an April tentative ID for ID1_7, which is a July tentative ID.

In response to the request, the link determiner 208 in the data collecting apparatus 200 refers to the associations in the tentative-ID manager 205 to identify ID1_4, which is the April tentative ID. Then, by referring to the tentative-ID link relationship manager 206, the link determiner 208 searches for a tentative-ID link relationship including ID1_4. In this case, the tentative-ID link relationship in which ID1_4 and ID1_1 are linked to each other, the tentative-ID link relationship being generated in step S301, is already stored in the tentative-ID link relationship manager 206.

In this case, if ID1_7 is further linked to ID1_4 in the tentative-ID link relationship in which ID1_4 and ID1_1 are linked to each other, as illustrated in a table 1203, the total of the weights of the tentative IDs is 75 (negative), which is larger than or equal to the upper-limit value "50". Thus, the link-information outputter 209 issues, to the data analyzing apparatus 300, a notification indicating that the link information cannot be transmitted.

After step S302, in July, the data analyzing apparatus 300 may issue a request for a January tentative ID (S304), that is, the information communicator 301 in the data analyzing apparatus 300 may issue a request for link information indicating a January tentative ID for ID1_7, which is a July tentative ID.

In this case, the link determiner 208 in the data collecting apparatus 200 refers to the associations in the tentative-ID manager 205 to identify ID1_1, which is the January tentative ID. Then, by referring to the tentative-ID link relationship manager 206, the link determiner 208 searches for a tentative-ID link relationship including ID1_1. The tentative-ID link relationship in which ID1_4 and ID1_1 are linked to each other, the tentative-ID link relationship being generated in step S301, is already stored in the tentative-ID link relationship manager 206.

In this case, if ID1_7 is further linked to ID1_1 in the tentative-ID link relationship in which ID1_4 and ID1_1 are linked to each other, as illustrated in a table 1204, the total weight is 75, which is larger than or equal to the upper-limit value "50". Thus, the link-information outputter 209 issues, to the data analyzing apparatus 300, a notification indicating that the link information cannot be transmitted.

[1.5.4 Example of how to Determine Weighting]

Although the tentative IDs in the data 205b described above and illustrated in FIG. 13 are weighted, the weights assigned to the respective tentative IDs may be arbitrarily specified by an administrator of the data collecting apparatus 200. For example, the weights may be determined based on a combination of the rules described below. The weights may also be updated at an arbitrary timing.

- Each weight may be determined so as to have a smaller value for an earlier (older) tentative ID. Each weight may also be updated to have a smaller value for an earlier tentative ID.
- The weights may be changed for each user (i.e., for each personal ID) or may be common to all users (i.e., may be the same for all users).
- The weights may also be determined according to the data size (the amount of data) of log information (viewing history) in a predetermined period (a month). For example, the weight may be determined to have a larger value as the data size of the log information increases.
- Each weight may be determined every predetermined period (every month) in accordance with the degree of uniqueness of the viewing history. For example, when the programs included in the viewing history include many general programs anyone likes (i.e., high-rating programs), the number of viewers is large, which makes it difficult to identify an individual. Accordingly, in such a case, assuming that the degree of uniqueness of the viewing history is high, the weight is determined to have a small value.

For example, the log-information recorder 203 may specify the degree of uniqueness for each program. FIG. 16 is a table illustrating one example of data (viewing history) for which the degrees of uniqueness are specified. The degrees of uniqueness may be determined for respective programs, like those in data 203b illustrated in FIG. 16, the degrees of uniqueness of the programs included in the viewing history may be multiplied for each month, and the inverse of the multiplication result may be used as a weight. Each degree of uniqueness takes a value in the range of 0 to 1, and takes a value closer to 0 for a program that is thought to have less viewers.

Since the degrees of uniqueness are multiplied, as described above, the resulting degree of uniqueness gets closer to 0, and the weight increases, when the user watched even one unique program. The degree of uniqueness may be calculated by determining self-information from the probability that how many users in the viewing histories of all users have viewed a corresponding program.

[1.5.5 Method for Setting Upper-Limit Value]

The upper-limit value for the number of nodes (the number of links) or the upper-limit value for the weight total is stored in the privacy-policy manager 207. The upper-limit value for the number of nodes (the number of links) or the upper-limit value for the total weight may be specified for each user terminal apparatus 100 or may be made settable by the user via the user terminal apparatus 100.

[1.5.6 User Interface in Data Analyzing Apparatus 300]

The description below will be given of a user interface in the data analyzing apparatus 300. The "user interface" as used in this case refers to a display unit (not illustrated) in the data analyzing apparatus 300 or a display screen displayed on a display apparatus used together with the data analyzing apparatus 300.

FIG. 17 illustrates one example of a link-information request form. By inputting a tentative ID and a month in the request form illustrated in FIG. 17, the user of the data analyzing apparatus 300 can request a tentative ID for the input tentative ID and the input month.

FIG. 18 illustrates one example of a display screen when providing link information is permitted. Thus, when the tentative ID for the month input in the request form illustrated in FIG. 17 is obtained, the analyzer 306 in the data analyzing apparatus 300 can obtain, from the log-information recorder 303, the log information to which ID1_1 is given.

When the log information to which ID1_1 is given does not exist in the log-information recorder 303, for example, since the log information has been deleted, pressing a "download" button displayed on the display screen illustrated in FIG. 18 allows the data analyzing apparatus 300 to re-obtain the log information to which ID1_1 is given.

FIG. 19 illustrates one example of a display screen when providing the link information is not permitted.

[1.6 Advantages of First Embodiment]

In the first embodiment, under a certain restriction using a tentative-ID link relationship, the data collecting apparatus 200 provides, to the data analyzing apparatus 300, link information indicating a correspondence relationship of tentative IDs updated at a predetermined timing. When such a correspondence relationship is provided, the data analyzing apparatus 300 can perform, for example, comparison analysis between the current log information and log information obtained half a year ago or a year ago with respect to the same user. As a result, an appropriate service can be provided to the user in accordance with a result of the analysis.

When the link information is unlimitedly provided, it is possible to associate a large amount of log information for the same user, and thus there is a risk of the user being identified based on the association. In order to reduce such a risk, the data collecting apparatus 200 links tentative IDs for which a request for the provision thereof is issued by the data analyzing apparatus 300 and manages the linked tentative IDs, so that the data analyzing apparatus 300 cannot identify the correspondence relationship of a number of tentative IDs which is larger than or equal to a certain number.

Also, although whether or not the link information is to be provided is determined based on, for example, the number of tentative IDs (the number of nodes) included in the tentative-ID link relationship, it may be determined based on the weights. For example, performing processing, such as reducing the weight for a tentative ID given to old log information, makes it possible to flexibly provide the link information.

Second Embodiment

In the first embodiment described above, when the number of nodes included in a tentative-ID link relationship is larger than or equal to the upper-limit value, the link-information outputter 209 issues a notification indicating that the link information cannot be transmitted. In contrast, when the link information cannot be transmitted, an information providing system according to a second embodiment transmits statistical information instead.

The term "statistical information" as used herein refers to information in which a viewing history given a tentative ID whose link information is requested and viewing histories given tentative IDs different from that tentative ID are mixed. The statistical information is provided, for example, in a form showing viewing frequencies for respective genres in a viewing history for one month. With such statistical information, it is difficult to identify an individual.

When the statistical information is provided in a form like the form of viewing frequencies for respective genres, it can be said that the analysis to be performed by the data analyzing apparatus 300 is performed by a data collecting apparatus 200a instead.

[2.1 Configuration of Information Providing System 10]

Since an overall configuration and the configurations of the user terminal apparatus 100 and the data analyzing apparatus 300 are the same as or similar to those described in the first embodiment and illustrated in FIGS. 2, 3, and 10, descriptions thereof are not given hereinafter. In the second embodiment, although the configuration of the data collecting apparatus 200a differs from that of the corresponding apparatus described above, the entire system in the second embodiment is also referred to as "information providing system 10".

[2.2 Data Collecting Apparatus 200a]

Figure 20:
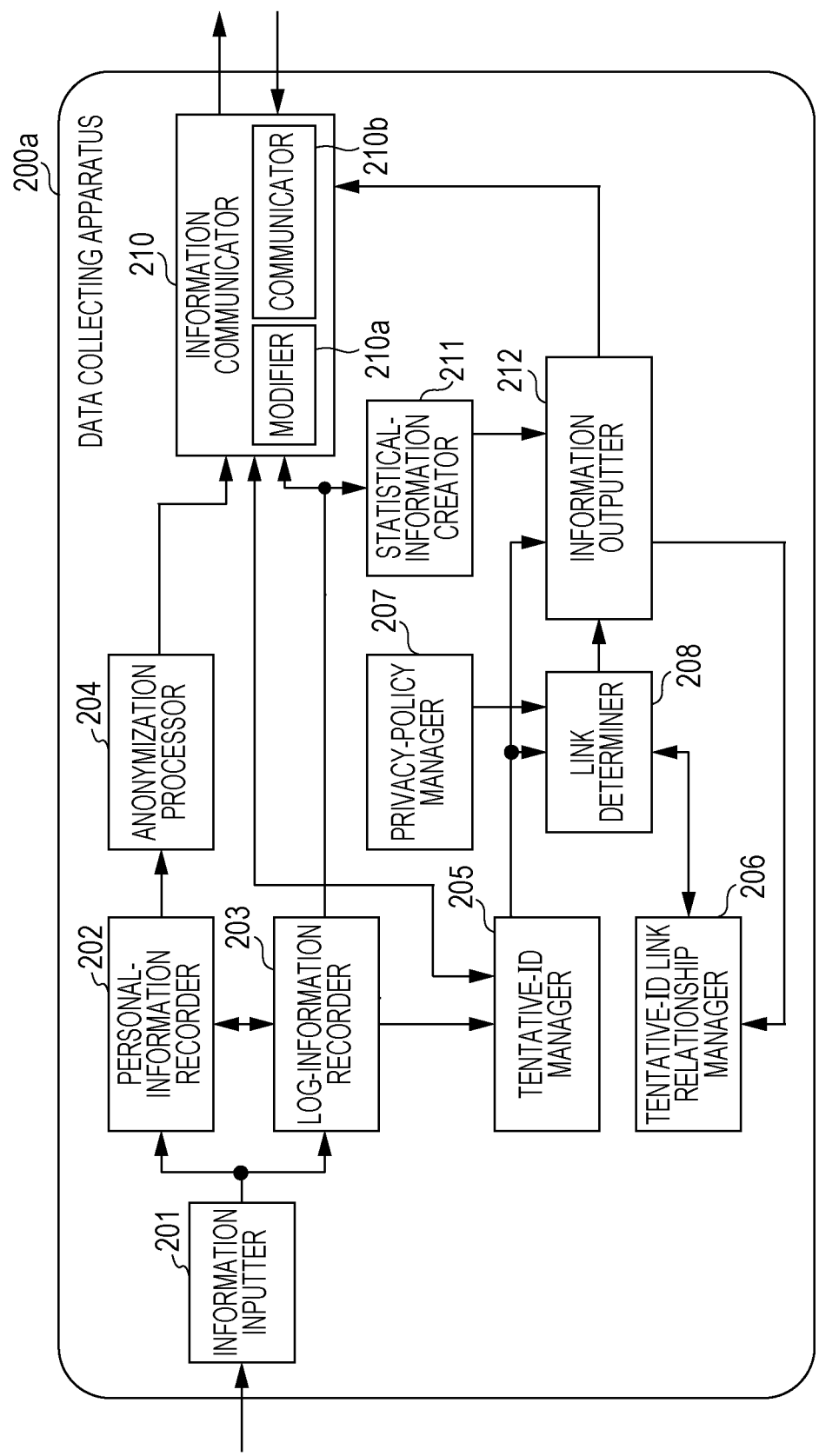
FIG. 20 is a block diagram illustrating the configuration of a data collecting apparatus according to a second embodiment.

FIG. 20 is a block diagram illustrating the configuration of the data collecting apparatus 200a according to the second embodiment. Differences from the data collecting apparatus 200a are that the data collecting apparatus 200 further includes a statistical-information creator 211 and includes an information outputter 212 instead of the link-information outputter 209. In the data collecting apparatus 200a, constituent elements that are substantially the same as those in the data collecting apparatus 200 are denoted by the same reference numerals, and detailed descriptions thereof are not given hereinafter.

[2.2.1 Statistical-Information Creator 211]

Upon input of the log information recorded in the log-information recorder 203, the statistical-information creator 211 creates statistical information, for example, viewing frequencies for respective genres in a viewing history for one month or the like. The statistical information is, for example, information indicating that dramas are watched three times and baseball games are watched ten times in a month.

Also, upon obtaining a plurality of designated tentative IDs from the data analyzing apparatus 300, the statistical-information creator 211 determines viewing frequencies for respective genres in a viewing history in a month by mixing viewing histories given the designated tentative IDs. For example, the statistical-information creator 211 uses the viewing histories of IDx_4 and IDy_4 (x and y are positive integers) in addition to ID1_4 to determine the viewing frequencies for respective genres in a viewing history in a month. The viewing frequencies in this case are information indicating that dramas were watched 20 times, baseball games were watched 50 times, and cooking programs were watched 33 times in January.

Since such viewing frequencies determined using the mixed tentative IDs are provided as the statistical information, even when the user corresponding to ID1_4 watched dramas five times, watched baseball games 50 times, and watched cooking programs zero times, the data analyzing apparatus 300 cannot distinguish this information. That is, the statistical-information creator 211 creates information that does not lead to personal identification, by performing statistical representation over a plurality of periods or statistical representation for a plurality of IDs. Specific details of the statistical information are arranged in advance between the data collecting apparatus 200a and the data analyzing apparatus 300.

[2.2.2 Information Outputter 212]

When the link determiner 208 determines that there is no problem with providing the link information, the information outputter 212 outputs the link information, and when the link determiner 208 determines that there is a problem with providing the link information, the information outputter 212 outputs the statistical information created by the statistical-information creator 211.

[2.3 Operation of Information Providing System 10]

Next, a description will be given of the operation of the information providing system 10 according to the second embodiment. FIG. 21 is a sequence diagram illustrating the operation of the information providing system 10 according to the second embodiment.

In the sequence diagram illustrated in FIG. 21, if the number of nodes exceeds the upper-limit value in step S107 (YES in S107), the statistical-information creator 211 creates statistical information, unlike the sequence diagram illustrated in FIG. 11, and the information outputter 212 transmits the created statistical information to the data analyzing apparatus 300 (5110). The statistical information is the same as or similar to that described above.

[2.4 User Interface in Data Analyzing Apparatus 300]

A description will be given of a user interface in the data analyzing apparatus 300. FIG. 22 illustrates one example of a link-information request form according to the second embodiment. A difference from the request form illustrated in FIG. 17 is that the request form illustrated in FIG. 22 further has a form for applying for transmission of the statistical information when providing the link information is not permitted.

FIG. 23 illustrates one example of a display screen when providing the link information is not permitted. FIG. 23 illustrates an example of a display screen in a case in which, when the link information is requested via the request form illustrated in FIG. 22, providing the link information is not permitted, and the statistical information is transmitted.

Although, in the example illustrated in FIG. 22, a tentative ID used for the statistical information is designated when the link information is requested, the tentative ID may be designated after the link information is requested. FIG. 24 illustrates one example of a display screen that is displayed when providing the link information is not permitted and that includes an entry form for a tentative ID used for the statistical information.

In either of the display screens in FIGS. 23 and 24, when the "download" button is pressed, the data analyzing apparatus 300 can obtain the statistical information.

[2.5 Advantages of Second Embodiment]

In the second embodiment, even when unable to provide the link information, the data collecting apparatus 200a can provide the statistical information instead of the link information. By performing analysis using the statistical information, the data analyzing apparatus 300 can increase the accuracy of the analysis. Information that leads to personal identification is not obtained from the statistical information, unlike the link information.

Third Embodiment

According to an information providing system 10 in a third embodiment, when a data analyzing apparatus 300b deletes link information or log information provided in the past, a data collecting apparatus 200b confirms the deletion and then erases the tentative-ID link relationship and so on.

[3.1 Configuration of Information Providing System 10]

Since an overall configuration and the configuration of the user terminal apparatus 100 are the same as or similar to those described above in the first embodiment and illustrated in FIGS. 2 and 3, descriptions thereof are not given hereinafter. Although the configurations of the data collecting apparatus 200b and the data analyzing apparatus 300b in the third embodiment differ from those of the corresponding apparatuses described above, the entire system in the third embodiment is also referred to as "information providing system 10".

[3.2 Data Collecting Apparatus 200b]

Figure 25:
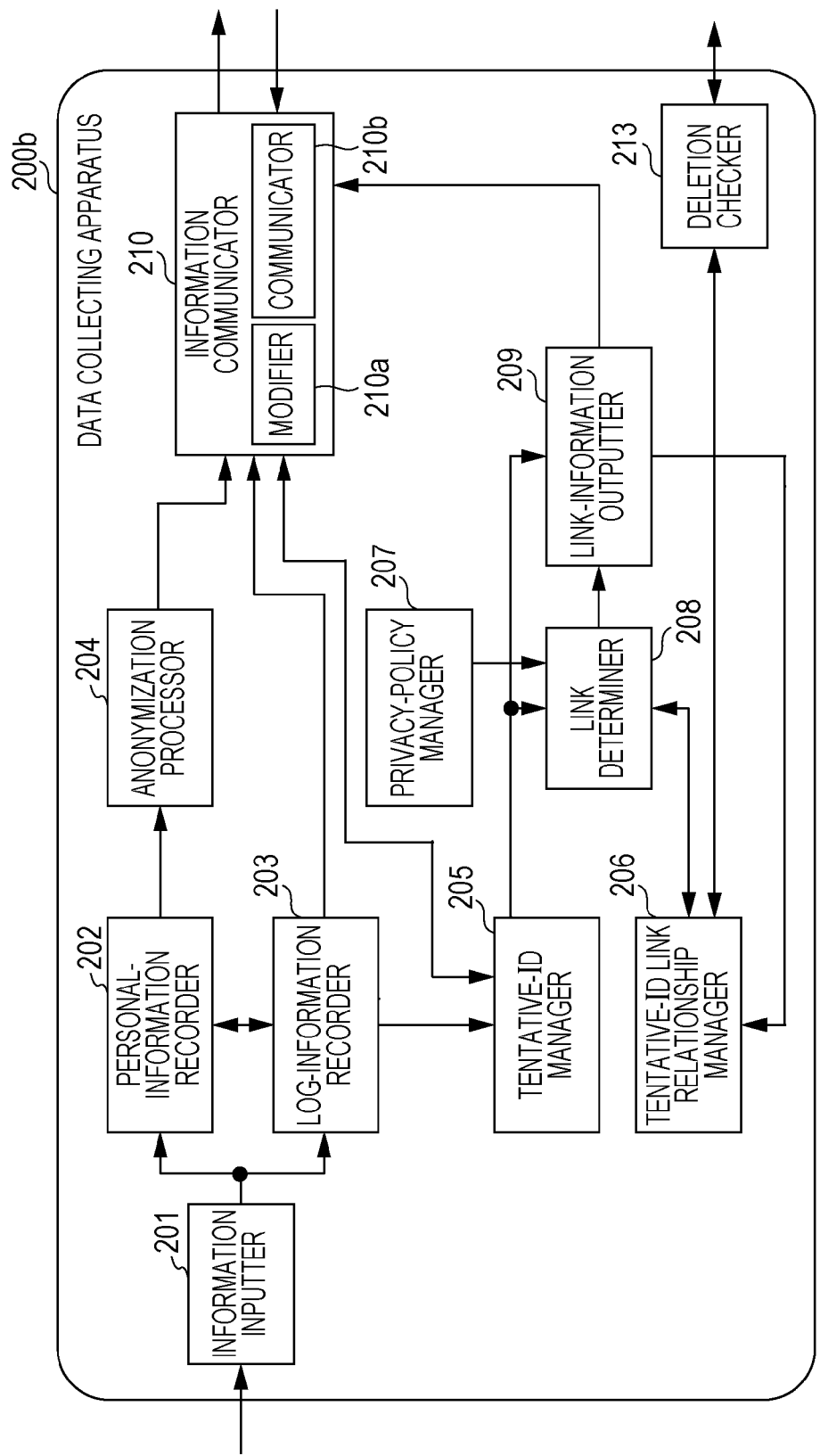
FIG. 25 is a block diagram illustrating the configuration of a data collecting apparatus according to a third embodiment.

FIG. 25 is a block diagram illustrating the configuration of the data collecting apparatus 200b according to the third embodiment. A difference from the data collecting apparatus 200 is that the data collecting apparatus 200b further includes a deletion checker 213. In the data collecting apparatus 200b, constituent elements that are substantially the same as those in the data collecting apparatus 200 are denoted by the same reference numerals, and detailed descriptions thereof are not given hereinafter.

[3.2.1 Deletion Checker 213]

The deletion checker 213 checks whether or not the link information is deleted in the data analyzing apparatus 300b or whether or not the log information is deleted in the data analyzing apparatus 300b. A method for the checking is, for example, that whether or not the data analyzing apparatus 300b has executed a deletion command is checked over a network. The deletion checker 213 may confirm the deletion offline.

[3.3 Data Analyzing Apparatus 300b]

Figure 26:
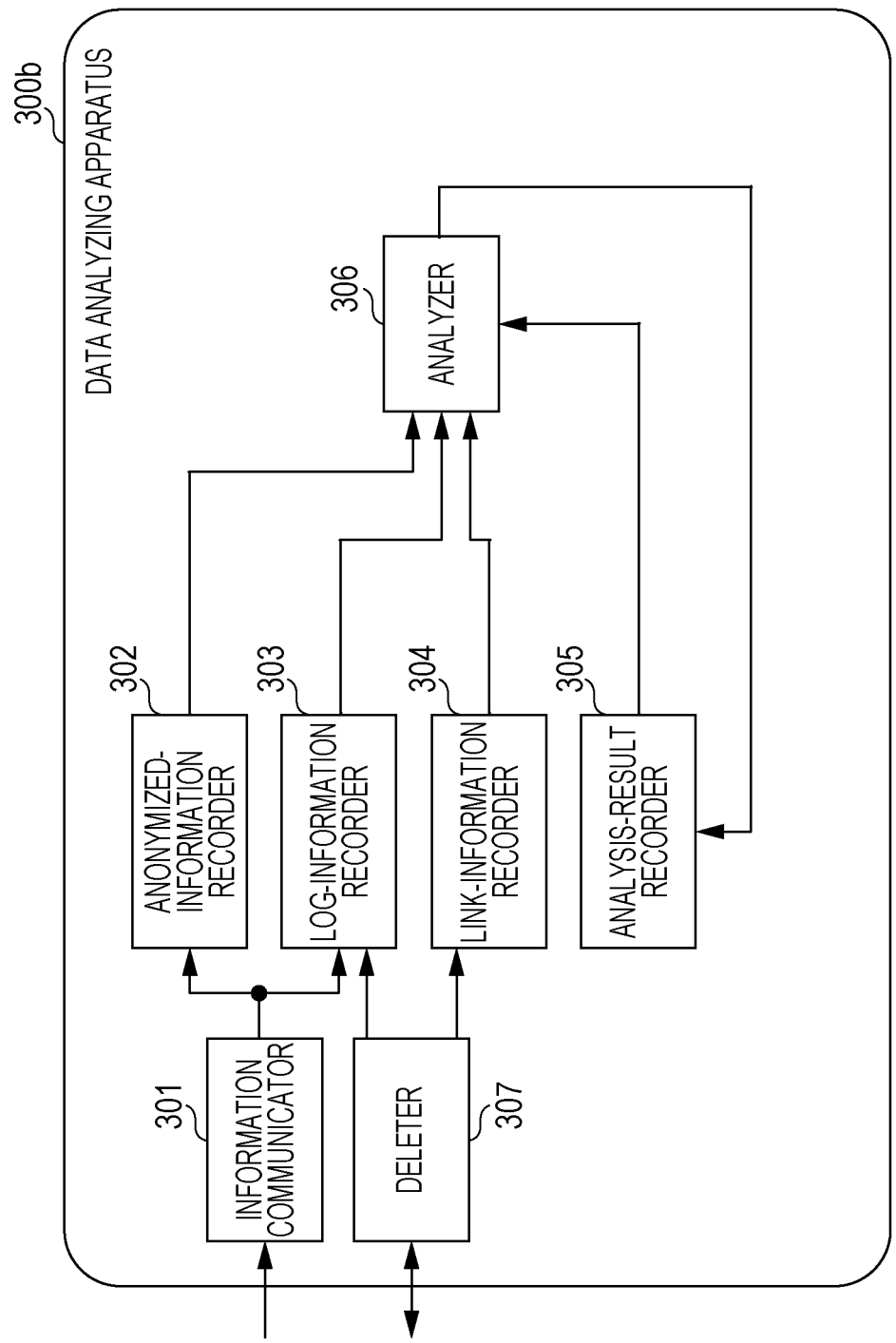
FIG. 26 is a block diagram illustrating the configuration of a data analyzing apparatus according to the third embodiment.

FIG. 26 is a block diagram illustrating the configuration of the data analyzing apparatus 300b according to the third embodiment. A difference from the data analyzing apparatus 300 is that the data analyzing apparatus 300b further includes a deleter 307. In the data analyzing apparatus 300b, constituent elements that are substantially the same as those in the data analyzing apparatus 300 are denoted by the same reference numerals, and detailed descriptions thereof are not given hereinafter.

[3.3.1 Deleter 307]

The deleter 307 deletes the log information recorded in the log-information recorder 303 or the link information recorded in the link-information recorder 304 and issues a notification to the effect that the information is deleted to the data collecting apparatus 200b. An instruction for the information deletion may be given via a user interface (not illustrated) included in the data analyzing apparatus 300b or may be given by obtaining a deletion command from other equipment over a network. Whether or not the deletion is complete deletion or partial deletion is pre-specified as the level of the deletion.

[3.4 Operation of Information Providing System 10]

Figure 27:
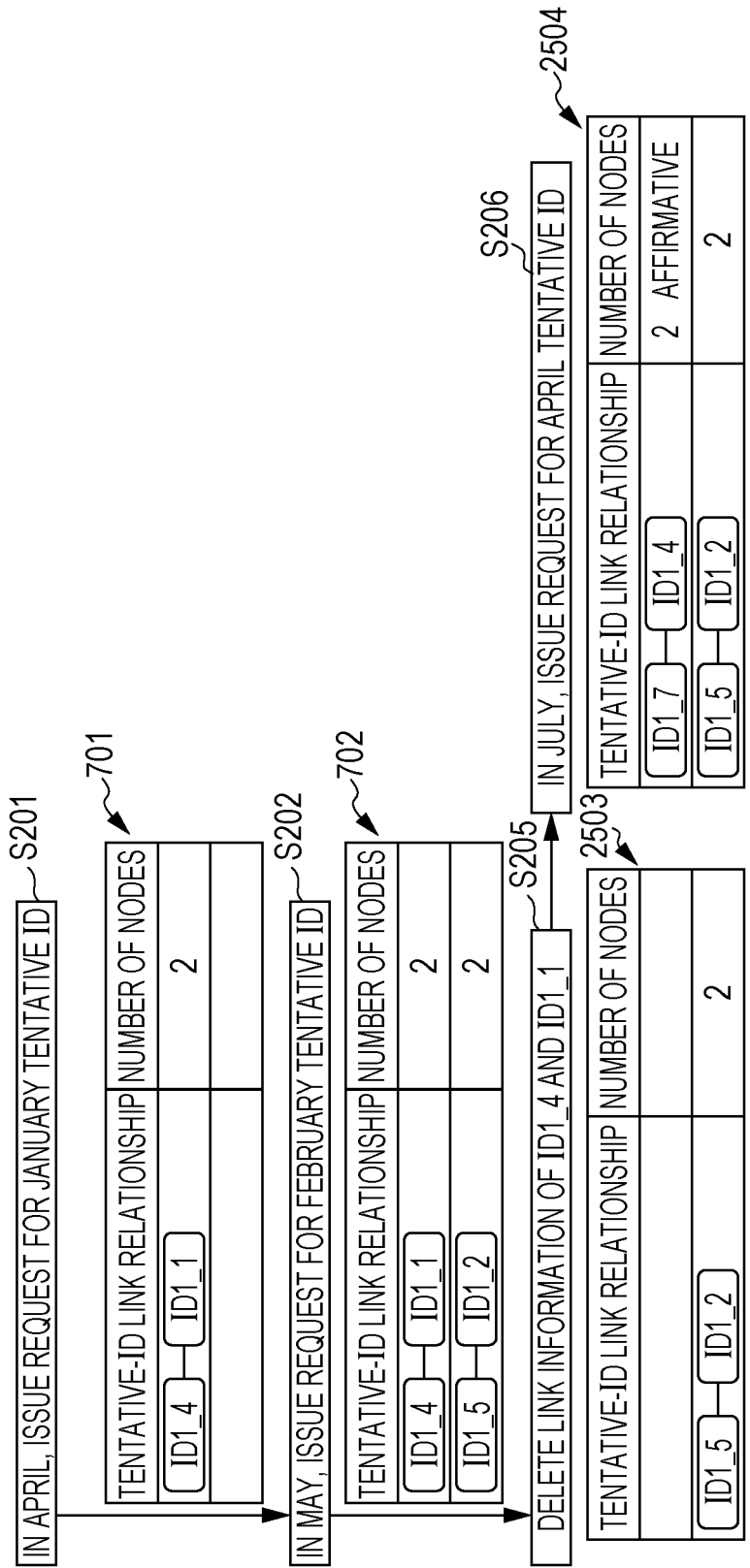
FIG. 27 illustrates an operation when a deleter erases link information.

Next, a description will be given of the operation of the information providing system 10 according to the third embodiment. First, a description will be given of an example in which the deleter 307 erases the link information. FIG. 27 is a diagram illustrating an operation when the deleter 307 erases the link information. Since operations in steps S201 and S202 in FIG. 27 are analogous to the corresponding steps in FIG. 8, descriptions thereof are not given hereinafter.

After step S202, the deleter 307 in the data analyzing apparatus 300b deletes the link information in which ID1_4 and ID1_1 are associated with each other (S205). In response, the deletion checker 213 in the data collecting apparatus 200b confirms the deletion (e.g., a deletion command) of the link information and erases at least the link of ID1_4 and the link of ID1_1 in the tentative-ID link relationship manager 206. As a result, the data in the tentative-ID link relationship manager 206 takes a form as in a table 2503.

Thereafter, in July, the data analyzing apparatus 300b issues a request for an April tentative ID (S206). In response to the request, the link determiner 208 in the data collecting apparatus 200b refers to the associations in the tentative-ID manager 205 to identify ID1_4, which is the April tentative ID. Then, by referring to the tentative-ID link relationship manager 206, the link determiner 208 searches for a tentative-ID link relationship including ID1_4 and recognizes that such a tentative-ID link relationship does not exist (has been deleted).

Accordingly, the link determiner 208 generates a tentative-ID link relationship in which the identified ID1_4 is linked to ID1_7 in a tree structure and calculates the number of nodes included in the generated tentative-ID link relationship. Since the number of nodes becomes 2 (affirmative), the link-information outputter 209 transmits the link information to the data analyzing apparatus 300b. The link determiner 208 stores the generated tentative-ID link relationship in the tentative-ID link relationship manager 206, so that the data in the tentative-ID link relationship manager 206 takes a form as in a table 2504.

Figure 28:
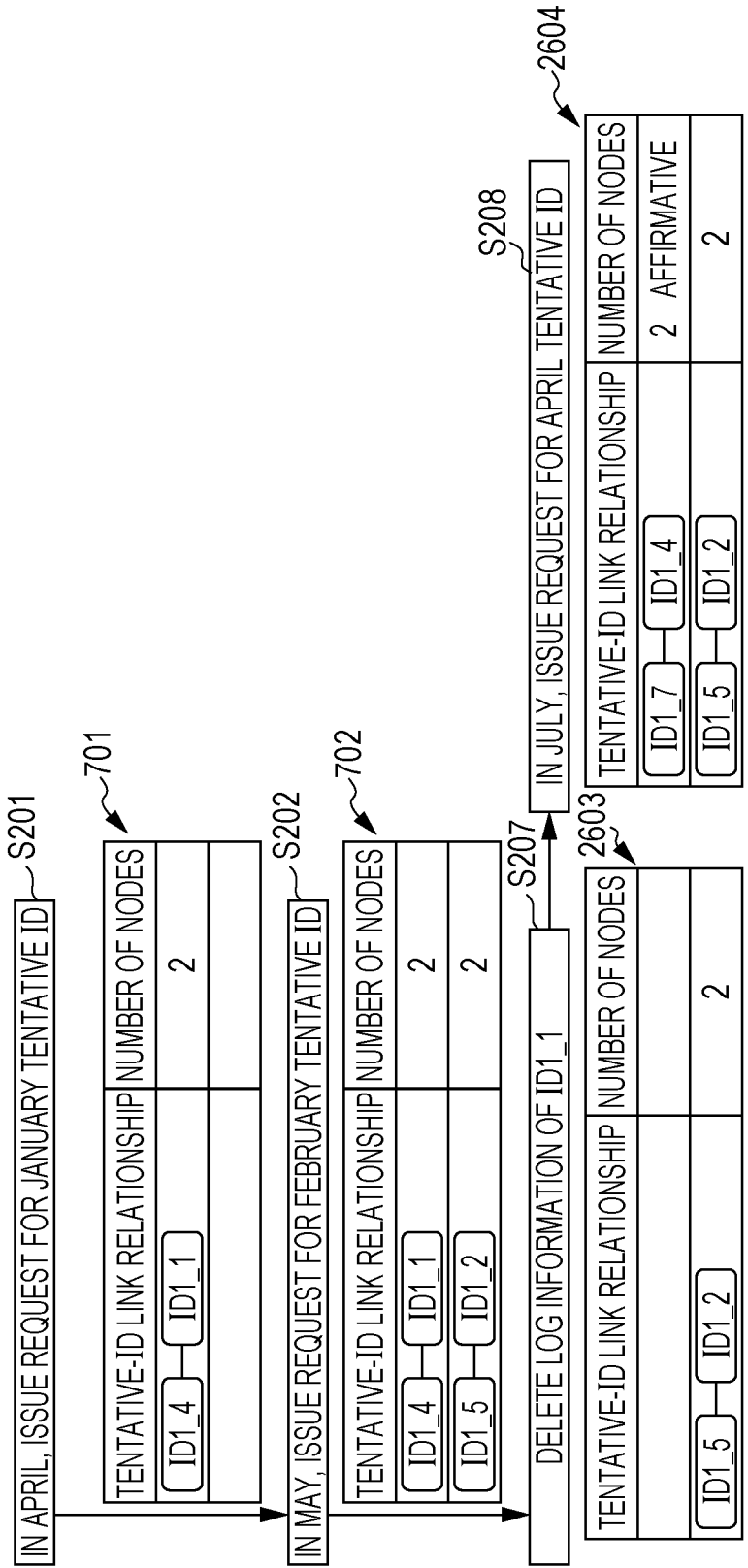
FIG. 28 illustrates an operation when the deleter erases log information.

Next, a description will be given of an example in which the deleter 307 erases the log information. FIG. 28 illustrates an operation when the deleter 307 erases the log information. Since operations in steps S201 and S202 in FIG. 28 are analogous to the corresponding steps in FIG. 8, descriptions thereof are not given hereinafter.

After step S202, the deleter 307 in the data analyzing apparatus 300b deletes the log information to which ID1_1 is given (S207). In response, the deletion checker 213 in the data collecting apparatus 200b confirms the deletion (e.g., a deletion command) of the log information and erases all tentative-ID link relationships including ID1_1 in the tentative-ID link relationship manager 206. As a result, the data in the tentative-ID link relationship manager 206 takes a form as in a table 2603.

Thereafter, in July, the data analyzing apparatus 300b issues a request for an April tentative ID (S208). In response to the request, the link determiner 208 in the data collecting apparatus 200b refers to the associations in the tentative-ID manager 205 to identify ID1_4, which is the April tentative ID. Then, by referring to the tentative-ID link relationship manager 206, the link determiner 208 searches for a tentative-ID link relationship including ID1_4 and recognizes that such a tentative-ID link relationship does not exist (has been deleted).

Accordingly, the link determiner 208 generates a tentative-ID link relationship in which the identified ID1_4 is linked to ID1_7 in a tree structure and calculates the number of nodes included in the generated tentative-ID link relationship. Since the number of nodes becomes 2 (affirmative), the link-information outputter 209 transmits the link information to the data analyzing apparatus 300b. The link determiner 208 stores the generated tentative-ID link relationship in the tentative-ID link relationship manager 206, so that the data in the tentative-ID link relationship manager 206 takes a form as in a table 2604.

The timings at which the link information and the log information are deleted are not limited to the examples in FIGS. 27 and 28, and the link information and the log information may be deleted at any timings.

[3.5 Advantages of Third Embodiment]

In the third embodiment, the deletion checker 213 in the data collecting apparatus 200b confirms the link-information deletion or log-information deletion performed by the data analyzing apparatus 300b and updates the contents of the tentative-ID link relationship manager 206. Thus, in order to obtain new link information, the data analyzing apparatus 300b needs to delete already obtained link information and log information. This suppresses an amount of information more than required being accumulated in the data analyzing apparatus 300b. Thus, the risk of an individual being identified based on the log information is reduced.

Fourth Embodiment

In an information providing system 10 according to a fourth embodiment, each time a data collecting apparatus 200c provides log information given a tentative ID to a data analyzing apparatus 300c, the data collecting apparatus 200c sums the weight of the log information. When the total weight is larger than or equal to a predetermined upper-limit value, the data collecting apparatus 200c updates the tentative ID.

In this case, the degrees of uniqueness are pre-specified for the log information, for example, as illustrated in FIG. 16, and the weights of the log information are determined based on the degrees of uniqueness. The degree of uniqueness is an index that takes a larger value as the log information is rarer (as the degree of rarity increases). The degree of uniqueness serves as an index indicating the ease of identifying an individual.

[4.1 Configuration of Information Providing System 10]

Figure 29:
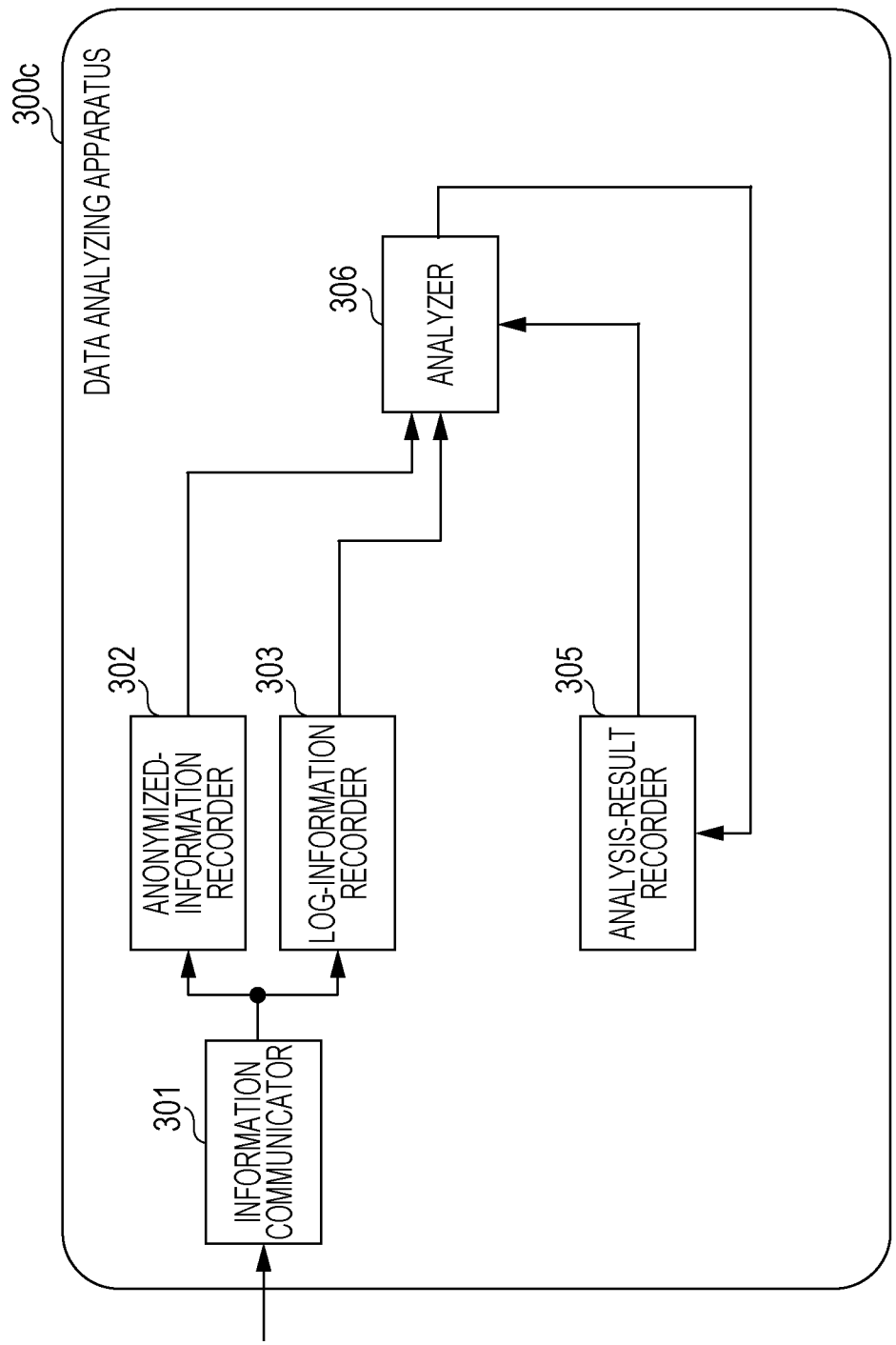
FIG. 29 is a block diagram illustrating the configuration of a data analyzing apparatus according to a fourth embodiment.

Since an overall configuration and the configuration of the user terminal apparatus 100 are the same as or similar to those described in the first embodiment and illustrated in FIGS. 2 and 3, descriptions thereof are not given hereinafter. FIG. 29 is a block diagram illustrating the configuration of the data analyzing apparatus 300c. Since the configuration of the data analyzing apparatus 300c is the same as a configuration obtained by eliminating the link-information recorder 304 from the data analyzing apparatus 300, a description of the configuration is not given hereinafter.

Although the configurations of the data collecting apparatus 200c and the data analyzing apparatus 300c in the fourth embodiment differ from those of the corresponding apparatuses described above, the entire system in the fourth embodiment is also referred to as "information providing system 10".

[4.2 Data Collecting Apparatus 200c]

Figure 30:
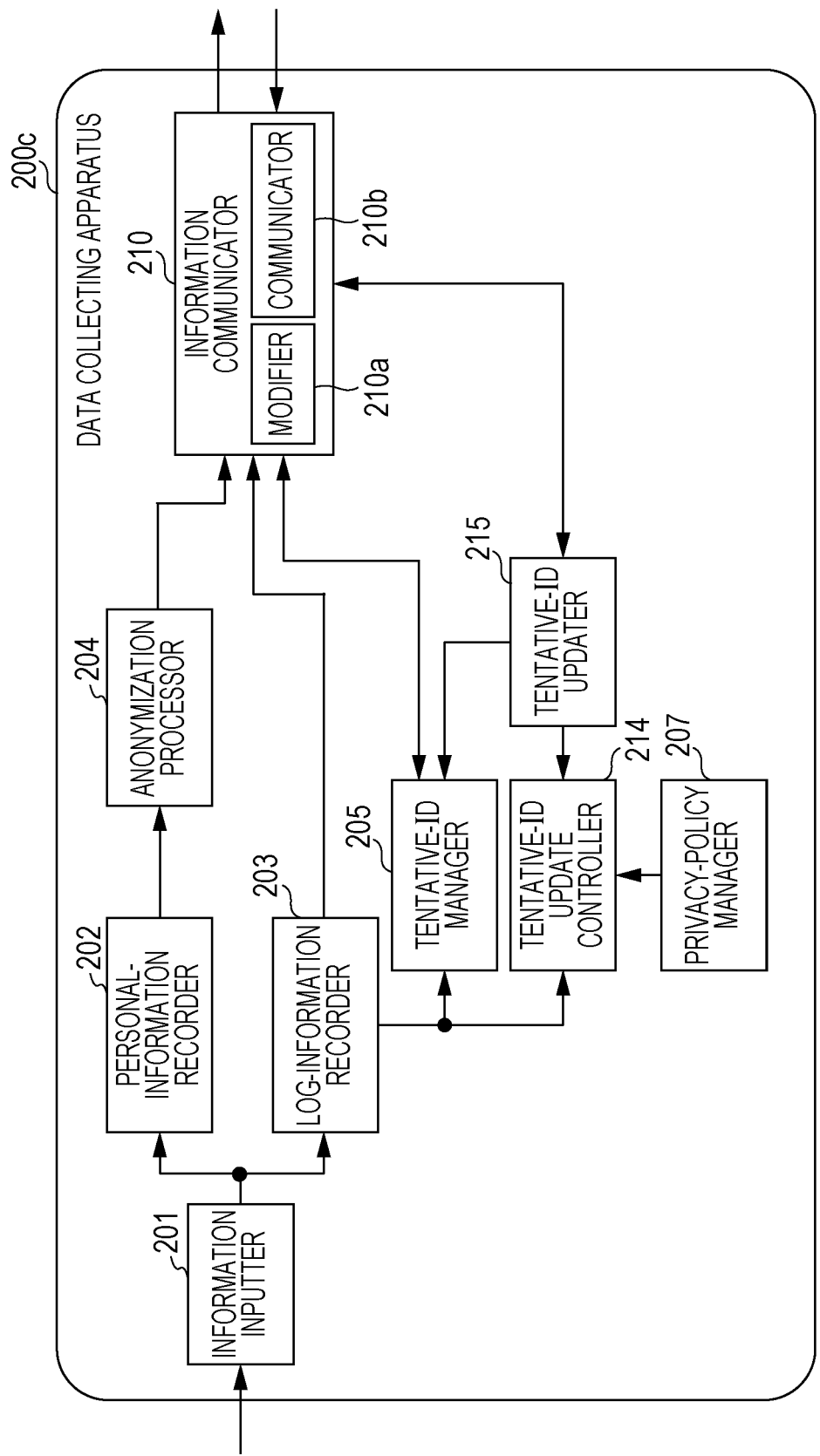
FIG. 30 is a block diagram illustrating the configuration of a data collecting apparatus according to the fourth embodiment.

FIG. 30 is a block diagram illustrating the configuration of the data collecting apparatus 200c according to the fourth embodiment. Since an information inputter 201, a personal-information recorder 202, a log-information recorder 203, an anonymization processor 204, a tentative-ID manager 205, and a privacy-policy manager 207 are the same as or similar to those in the data collecting apparatus 200, descriptions thereof are not given hereinafter. Unlike the data collecting apparatus 200, the data collecting apparatus 200b includes a tentative-ID update controller 214 and a tentative-ID updater 215.

[4.2.1 Tentative-ID Update Controller 214]

The tentative-ID update controller 214 manages the weights of log information, and each time log information given a tentative ID is provided to the data analyzing apparatus 300c, the tentative-ID update controller 214 sums the weight of the log information and uses the result thereof to determine the tentative-ID update described above. The tentative-ID update controller 214 compares the total weight with an upper-limit value stored in the privacy-policy manager 207 and outputs information indicating whether or not the total weight is larger than or equal to the upper-limit value.

[4.2.2 Tentative-ID Updater 215]

Upon receiving, from the tentative-ID update controller 214, information indicating that the total weight is larger than or equal to the upper-limit value, the tentative-ID updater 215 randomly updates the tentative ID so that it differs from other tentative IDs. The updated tentative ID is stored in the tentative-ID manager 205 in association with a corresponding personal ID. Also, when the tentative ID is updated, the tentative-ID updater 215 resets the total weight in the tentative-ID update controller 214.

[4.3 Operation of Information Providing System 10]

Figure 31:
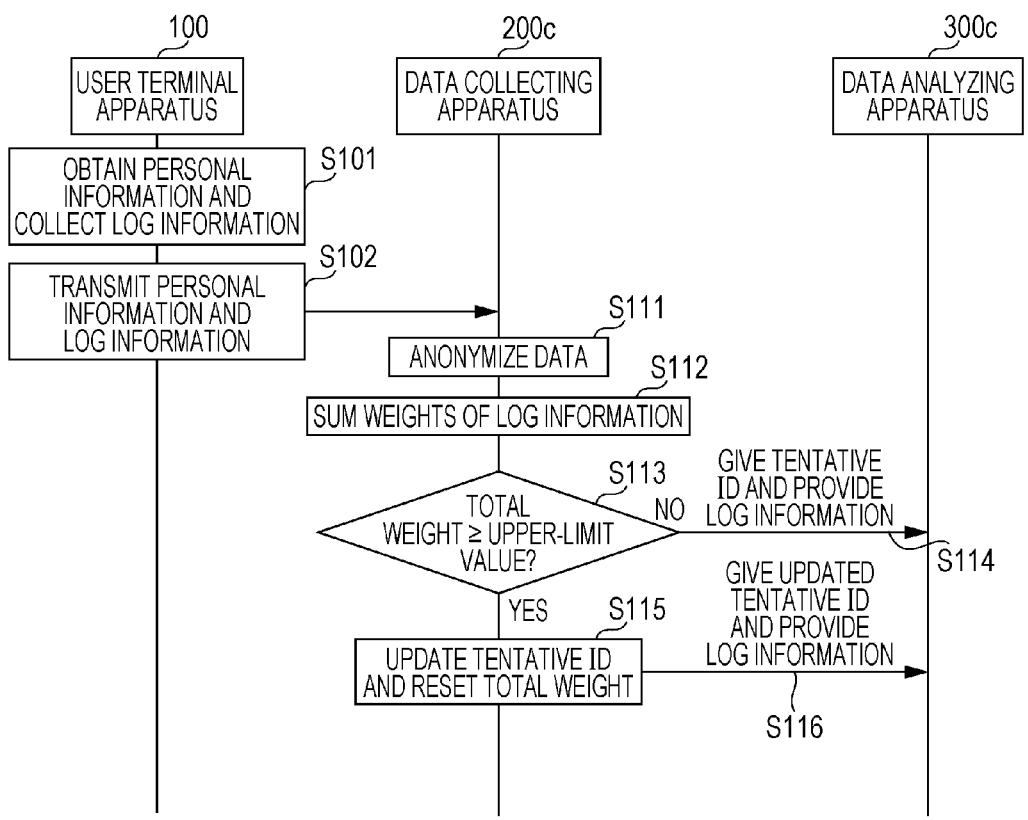
FIG. 31 is a sequence diagram illustrating the operation of an information providing system according to the fourth embodiment.

A description will be given of the operation of the information providing system 10 according to the fourth embodiment. FIG. 31 is a sequence diagram illustrating the operation of the information providing system 10 according to the fourth embodiment.

First, in the user terminal apparatus 100, personal information is obtained, and log information is collected (S101). The information provider 103 in the user terminal apparatus 100 transmits data including the personal information and the log information to the data collecting apparatus 200c (S102).

The data collecting apparatus 200c receives the data from the user terminal apparatus 100 and anonymizes the received data (S111).

Next, the tentative-ID update controller 214 sums the weights of the log information included in the data received in step S102 (S112). This summation is performed for each user terminal apparatus 100 and for each data analyzing apparatus 300c.

Next, the tentative-ID update controller 214 determines whether or not the total weight is larger than or equal to an upper-limit value stored in the privacy-policy manager 207 (S113). If the total weight is smaller than the upper-limit value (NO in S113), the information communicator 210 gives a corresponding tentative ID to the anonymized data (log information) and provides the resulting data to the data analyzing apparatus 300c (S114). If the total weight is larger than or equal to the upper-limit value (YES in S113), the tentative-ID updater 215 randomly updates the tentative ID corresponding to the anonymized data so that the tentative ID differs from other tentative IDs, and resets the total weight (S115).

The information communicator 210 then gives the updated tentative ID to the anonymized data and provides the resulting data to the data analyzing apparatus 300c (S116).

[4.4 Advantages of Fourth Embodiment]

In the fourth embodiment, the data collecting apparatus 200c uses the total weight to manage how much of the log information of the specific user terminal apparatus 100 has been provided to the data analyzing apparatus 300c. Each piece of log information is given a weight indicating the possibility that an individual is identified from the log information. For example, log information including a viewing history of a program whose viewers are limited is given a larger weight. The data collecting apparatus 200c compares the summation value of the weights with the upper-limit value to thereby update the tentative ID.

In the first embodiment, the tentative ID is unconditionally updated at a certain timing. Thus, when the above-described link information is not used, the data analyzing apparatus 300 can perform comparison analysis on log information given the same tentative ID only in a period in which the tentative IDs are the same.

In contrast, in the fourth embodiment, the data collecting apparatus 200c finely manages, for each data analyzing apparatus 300c, the tentative-ID update timing by using the degrees of uniqueness (the weights) of log information. Thus, the data analyzing apparatus 300c can perform higher-accuracy comparison analysis on an appropriate amount of log information.

(Modifications)

Although the present disclosure has been described above in conjunction with the embodiments described above, the present disclosure is not limited to the embodiments described above. For example, the present disclosure also includes the following cases.

(1) In the first to third embodiments, the data collecting apparatus provides link information indicating a past tentative ID of the present tentative ID to the data analyzing apparatus. However, the link information may be information indicating the relationship of past tentative IDs. More specifically, in July, the data analyzing apparatus may request a tentative ID in January, which is earlier than April, for ID1_4, which is a tentative ID in April earlier than July, and in this case, the data collecting apparatus provides link information indicating that the January tentative ID ID1_4 for the April tentative ID was ID1_1.

(2) Although the log information in the first to fourth embodiments is a viewing history (genre information of a program), the log information is not particularly limiting. The information providing system or the data collecting apparatus in each embodiment described above may also be applicable to providing information other than the log information.

(3) Although, in the first to fourth embodiments, the information providing system has been described as having one data analyzing apparatus, the number of data analyzing apparatuses may be two or more. In each case, the tentative IDs are managed for each data analyzing apparatus. For example, the tentative-ID manager is provided for each data analyzing apparatus, and the tentative-ID link relationship manager is provided for each data analyzing apparatus. The update of the tentative ID and the calculation of the number of nodes included in a tentative-ID link relationship may also be performed for each data analyzing apparatus. Also, the total weight (sum) described in the first and fourth embodiments is also performed for each data analyzing apparatus.

(4) The constituent elements of the apparatuses and the processing of the apparatuses described above in the first to fourth embodiments may be combined as appropriate. For example, although, in the second and third embodiments, whether or not the link information can be transmitted is determined based on the number of nodes included in the tentative-ID link relationship, whether or not the link information can be transmitted may also be determined based on the total weight described above in the first embodiment.

The data collecting apparatus according to the first to third embodiments may further perform the tentative-ID update described above in the fourth embodiment.

(5) The personal-information inputter and the log-information collector in the user terminal apparatus according to the first to fourth embodiments may be an apparatus different from the user terminal apparatus. For example, the personal-information inputter may be a portable terminal, and the log-information collector may be some kind of sensor.

The personal-information inputter and the log-information collector may be incorporated into a TV when the log-information collector collects the viewing histories. When the log-information collector collects a body-weight log, the log-information collector may be incorporated into a weighing scale.

Also, identification information of a sensor included in the log-information collector or household electrical and electronic equipment may be input via the personal-information inputter to link the log-information collector and the user.

(6) Although the log information in the first to fourth embodiments is a viewing history of a program genre, the log information is not limited thereto. For example, the program information included in the viewing history may be not only a genre but also program information in an EPG or the like.

Also, for example, when the user terminal apparatus is a portable terminal, the log information may be movement history information (GPS information) of the portable terminal. When the user terminal apparatus functions as a remote controller for equipment, the log information may be an operation history of the user terminal apparatus (remote controller). For example, when a TV is operated via the user terminal apparatus, the log information may be information indicating which program was watched, information indicating how the channel switch was switched, or the like.

The log information may also be, for example, information indicating at which station and when the user got on or off a train. The log information may also be log information of the amount of power consumption in each home, log information of healthcare equipment, such as a weighing scale or sphygmomanometer, history of shopping, log information of WWW access, or the like. In addition, the log information may be an operation history or the amount of power consumption of household electrical and electronic equipment in each home.

(7) The technology described in the above aspects can be realized, for example, by the following types of cloud service. However, the types of service for which the technology described in the above aspects is realized are not limited to the types described below.

[Service Type 1: Inhouse Data Center Type]

Figure 32:
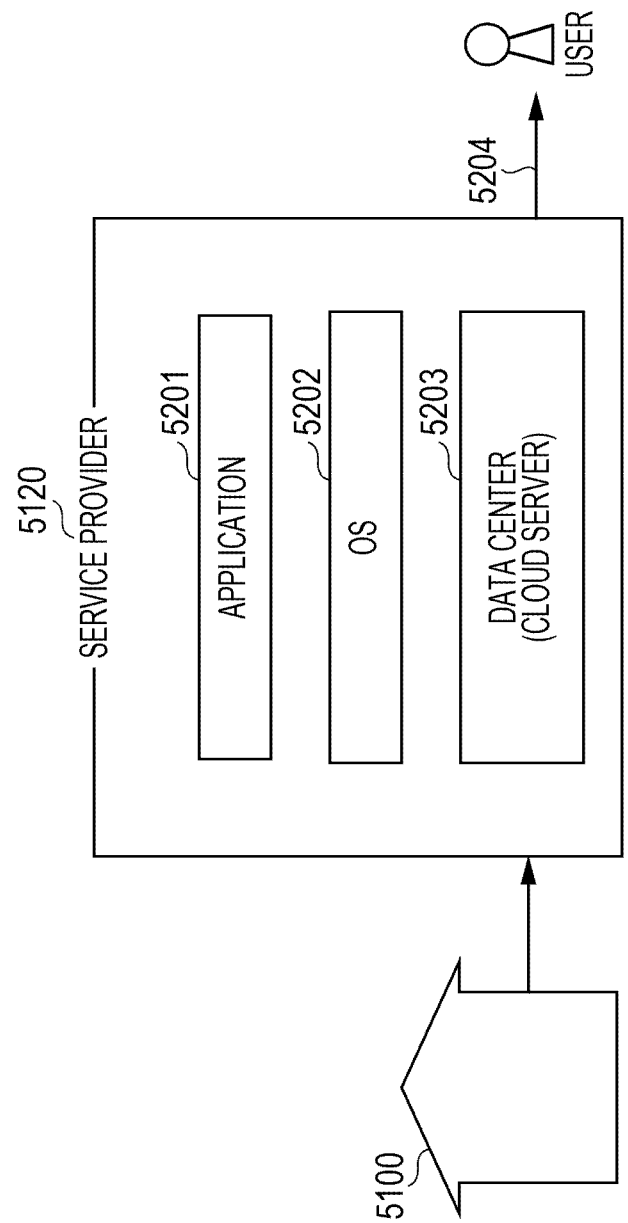
FIG. 32 is a diagram illustrating an overall picture of a service provided by an information management system for service type 1 (an inhouse data center type)

FIG. 32 illustrates service type 1 (an inhouse data center type). This type is a type in which a service provider 5120 obtains information from a group 5100 and provides a user with a service. In this type, the service provider 5120 has functions of a data-center operating company. That is, the service provider has a data center 5203 (the cloud server 5111) for managing big data. Thus, no data-center operating company exists.

In this type, the service provider 5120 operates and manages the data center 5203 (the cloud server 5111). The service provider 5120 manages an operating system (OS) 5202 and an application 5201. The service provider 5120 uses the OS 5202 and the application 5201, managed by the service provider 5120, to provide a service 5204.

[Service Type 2: IaaS Usage Type]

Figure 33:
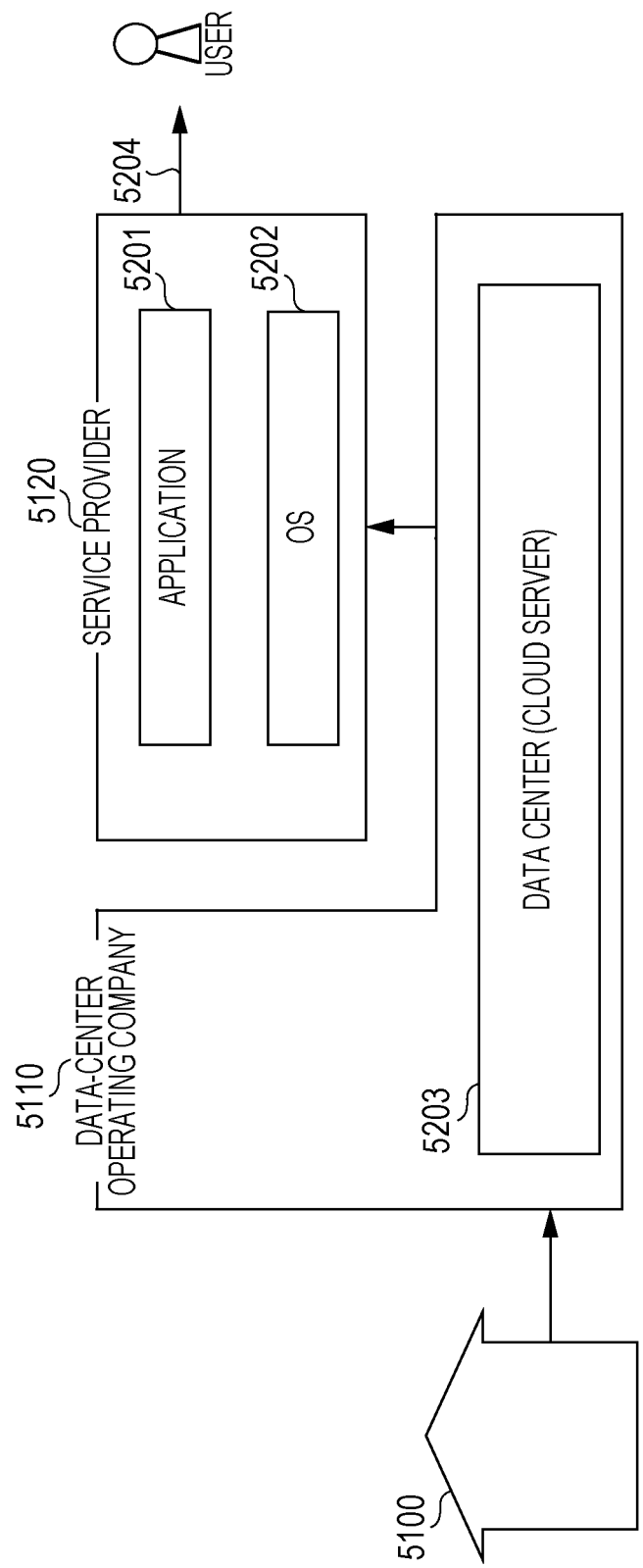
FIG. 33 is a diagram illustrating an overall picture of a service provided by an information management system for service type 2 (an IaaS usage type)

FIG. 33 illustrates service type 2 (an IaaS usage type). IaaS is an acronym of Infrastructure as a Service and is a cloud-service-providing model that provides, as a service over the Internet, infrastructure itself for constructing and operating a computer system.

In this type, a data-center operating company 5110 operates and manages a data center 5203 (the cloud server 5111). A service provider 5120 manages an OS 5202 and an application 5201. The service provider 5120 uses the OS 5202 and the application 5201, managed by the service provider 5120, to provide a service 5204.

[Service Type 3: PaaS Usage Type]

Figure 34:
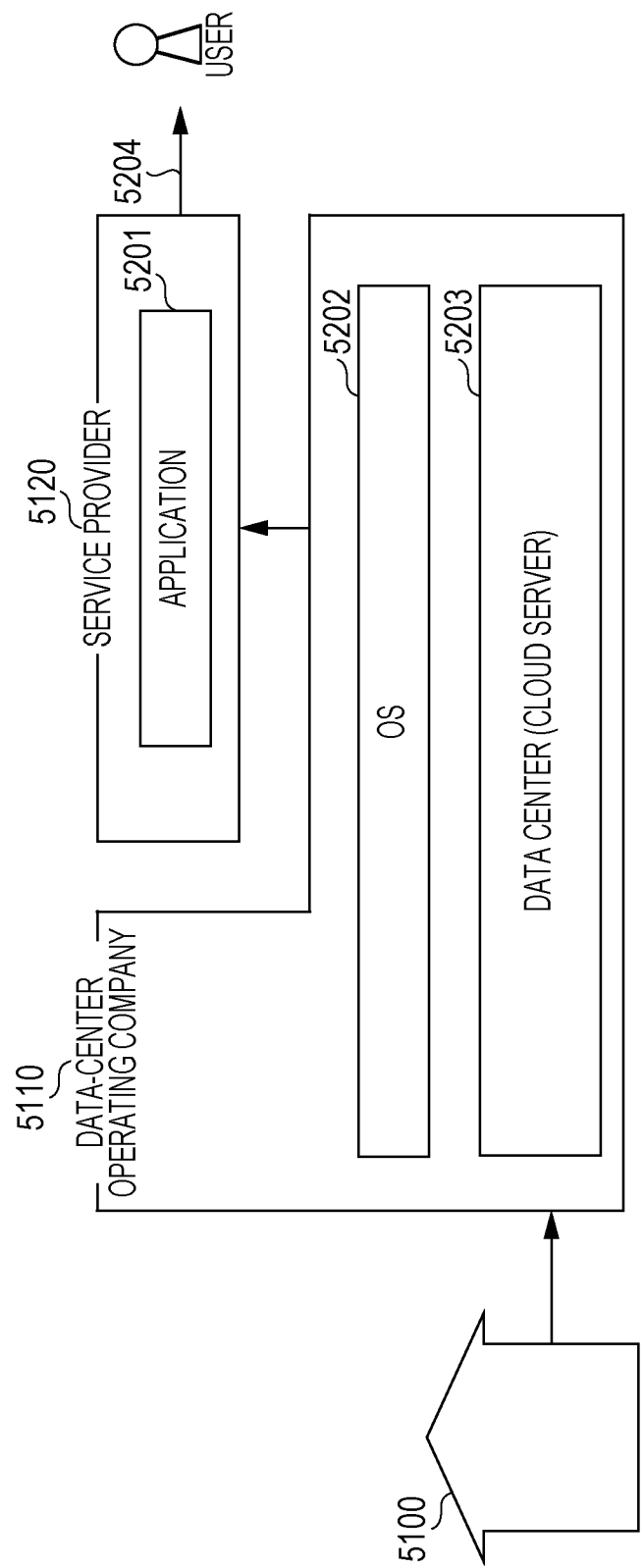
FIG. 34 is a diagram illustrating an overall picture of a service provided by an information management system for service type 3 (a PaaS usage type)

FIG. 34 illustrates service type 3 (a PaaS usage type). PaaS is an acronym of Platform as a Service and is a cloud-service-providing model that provides, as a service over the Internet, a platform that serves as a foundation for constructing and operating software.

In this type, a data-center operating company 5110 manages an OS 5202 and operates and manages a data center 5203 (the cloud server 5111). A service provider 5120 also manages an application 5201. The service provider 5120 uses the OS 5202, managed by the data-center operating company 5110, and the application 5201, managed by the service provider 5120, to provide a service 5204.

[Service Type 4: SaaS Usage Type]

Figure 35:
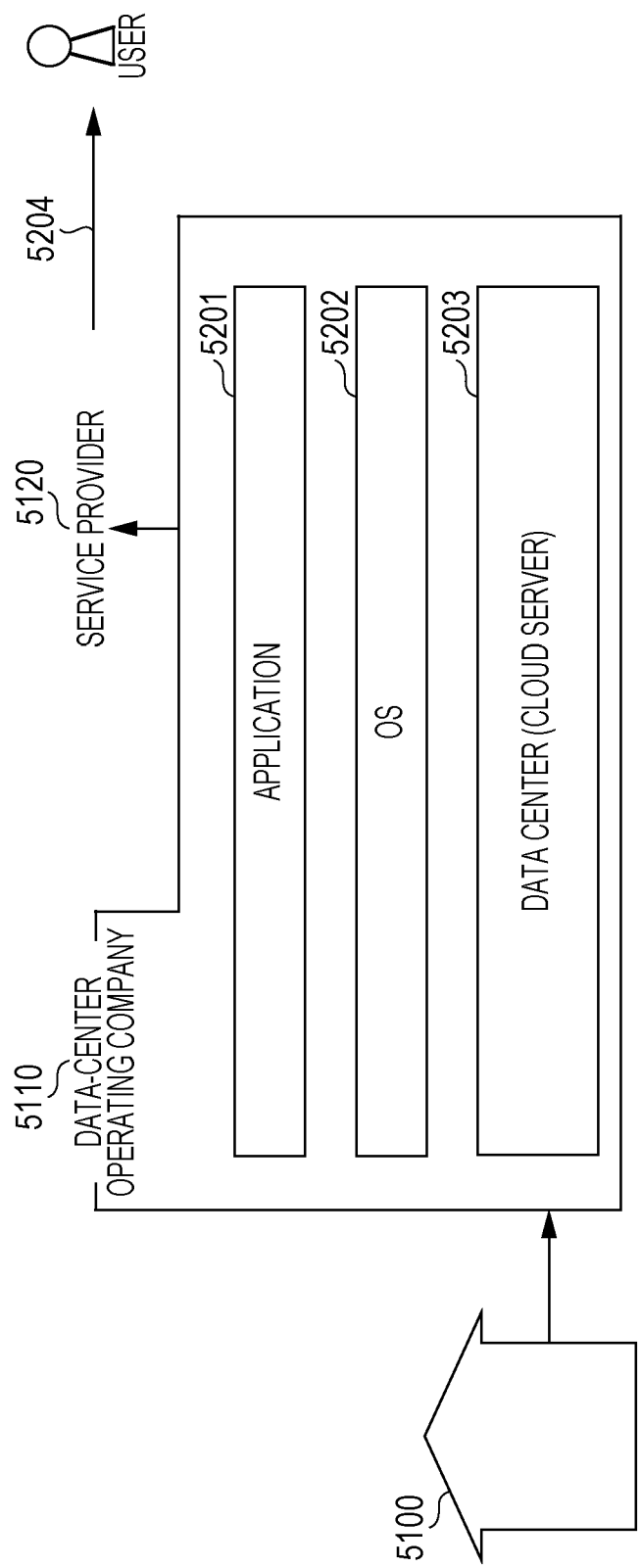
FIG. 35 is a diagram illustrating an overall picture of a service provided by an information management system for service type 4 (a SaaS usage type)

FIG. 35 illustrates service type 4 (a SaaS usage type). SaaS is an acronym of Software as a Service. SasS is a cloud-service-providing model having, for example, a function that allows companies and individuals (users) that do not own a data center (a cloud server) to use, over a network such as the Internet, applications provided by a platform provider that owns a data center (a cloud server).

In this type, a data-center operating company 5110 manages an application 5201 and an OS 5202 and operates and manages a data center 5203 (the cloud server 5111). A service provider 5120 uses the OS 5202 and the application 5201, managed by the data-center operating company 5110, to provide a service 5204.

It is assumed that, in any of the types described above, the service provider 5120 provides a service. Also, for example, the service provider or the data-center operating company may itself develop the OS, the application, a database for big data, or the like or may also outsource the development to a third party.

(8) In each embodiment described above, the individual constituent elements may be constituted by dedicated hardware or may be realized by executing a software program suitable for the constituent elements. A program executor, such as a central processing unit (CPU) or a processor, may read and execute a software program recorded in a recording medium, such as a hard disk or a semiconductor memory, to thereby realize each constituent element described above. In this case, the software for realizing the information providing apparatus according to each embodiment is a program as follows.

That is, this program causes a computer to execute an information providing method that is executed by an information providing apparatus that gives a tentative ID updated at a predetermined timing, instead of a personal ID, to log information associated with the personal ID and that provides the resulting log information. The information providing apparatus includes: a first storage that stores associations between the personal ID and a plurality of tentative IDs resulting from the updating; and a second storage that stores link-relationship information generated in response to a request for link information indicating a tentative ID at a timing other than the timing of one tentative ID, the tentative IDs corresponding to the request being linked in the link-relationship information. The information providing method includes: receiving a request for a tentative ID at a timing other than the timing of a first tentative ID; identifying a second tentative ID, which is the tentative ID at the other timing, by referring to the associations stored in the first storage; evaluating link-relationship information when the first tentative ID is further linked to link-relationship information stored in the second storage and including the second tentative ID; and determining whether or not to output the link information indicating the second tentative ID, based on a result of the evaluation.

(9) In each embodiment described above, a process executed by a particular processor may be executed by another processor. The order of the processes may be changed or may be executed in parallel.

Figure 36:
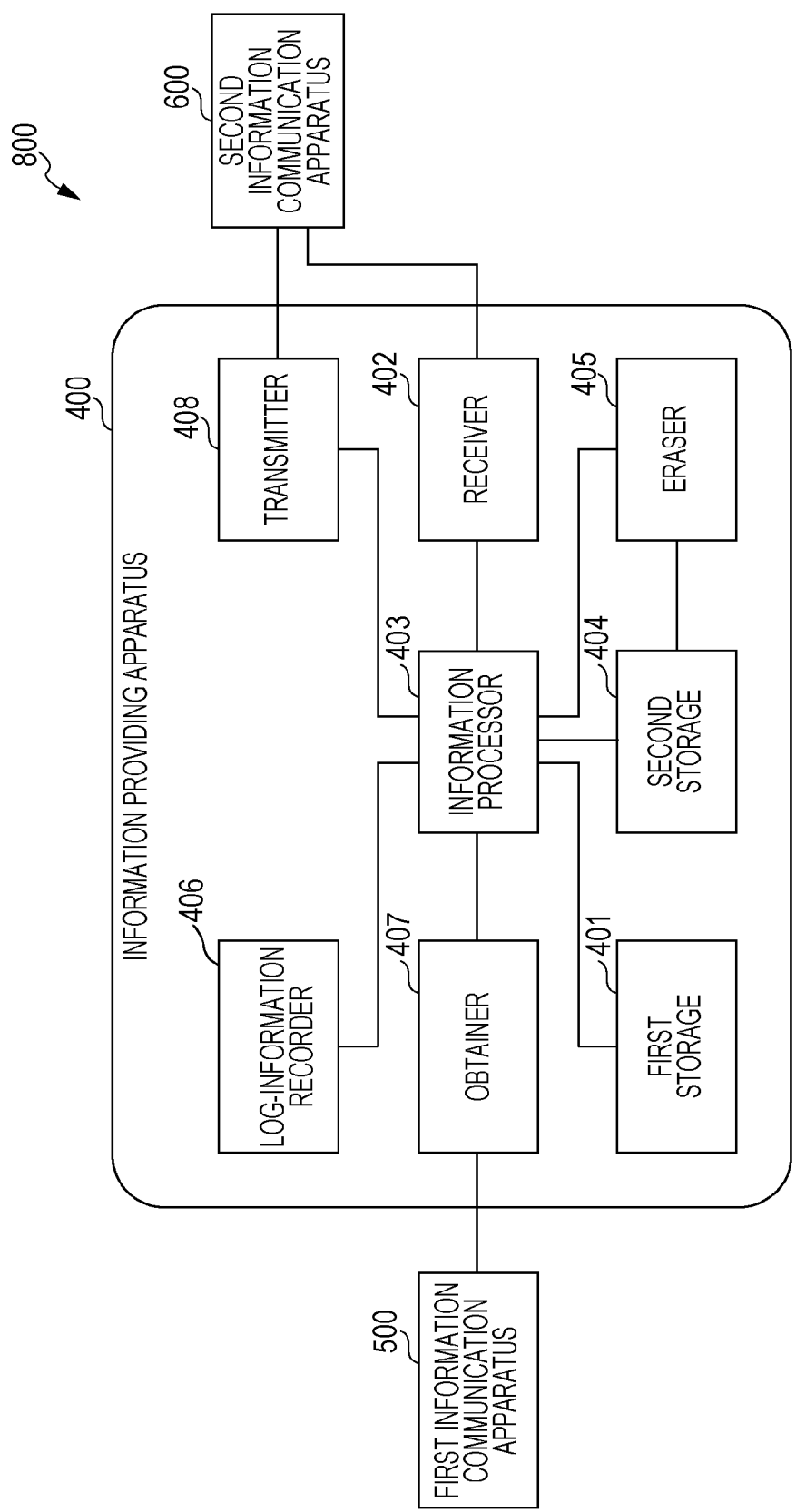
FIG. 36 is a block diagram illustrating another example configuration of the information providing system.

Also, the configuration (allocation of the constituent elements) of each apparatus described above in each embodiment is one example. For example, the data collecting apparatus described above in each embodiment described above may be realized as an information providing apparatus included in an information providing system as described below. FIG. 36 is a block diagram illustrating another example configuration of the information providing system.

An information providing system 800 illustrated in FIG. 36 includes a first information communication apparatus 500, an information providing apparatus 400, and a second information communication apparatus 600.

The first information communication apparatus 500 is an apparatus that collects log information and corresponds to the user terminal apparatus in each of the first to fourth embodiment. The first information communication apparatus 500 is, for example, a smartphone or a tablet terminal, and also may be equipment that can collect log information. Examples include healthcare equipment, a turnstile, and so on.

The information providing apparatus 400 obtains the log information, collected by the first information communication apparatus 500, from the first information communication apparatus 500, replaces the personal ID in the obtained log information with a tentative-ID updated at a predetermined timing, and provides the resulting log information. The information providing apparatus 400 corresponds to the data collecting apparatus in each of the first to fourth embodiments and is implemented, specifically, as a server apparatus or the like.

The second information communication apparatus 600 is an apparatus that receives log information to which a tentative ID is given, the log information being provided by the information providing apparatus 400, and that corresponds to the data analyzing apparatus in each of the first to fourth embodiments. Specifically, the second information communication apparatus 600 is implemented as a server apparatus or the like.

The configuration of the information providing apparatus 400 will be described below in detail.

The information providing apparatus 400 includes a first storage 401, a receiver 402, an information processor 403, a second storage 404, an eraser 405, a log-information recorder 406, an obtainer 407, and a transmitter 408.

The information providing apparatus 400 replaces the personal ID in the log information, associated with a personal ID, with a tentative-ID updated at a predetermined timing and provides the resulting log information. The predetermined timing is, for example, a timing at an interval of one month, but may be a timing at an irregular interval and is not particularly limiting.

Associations between a personal ID and a plurality of tentative IDs resulting from the updating are stored in the first storage 401. The first storage 401 is a constituent element corresponding to the tentative-ID manager 205 and is implemented by, specifically, a storage device, such as a semiconductor memory. The associations stored in the first storage 401 are, specifically, the data 205a illustrated in FIG. 7, but are not limited thereto.

The receiver 402 receives a request for link information indicating a tentative ID at a timing other than the timing of one tentative ID. The receiver 402 is a constituent element corresponding to the communicator 210b. Specifically, the receiver 402 is implemented by a communication circuit (communication module) or the like, but may be implemented as an entirety or part of a processor or microcomputer and may take any form. The above-described request has a data structure, for example, as illustrated in FIG. 12B, and the link information has a data structure, for example, as illustrated in FIG. 12D, but the data structures are not limited to such data structures.

In response to the request received by the receiver 402, the information processor 403 generates link-relationship information in which tentative IDs corresponding to the request are linked. The information processor 403 is a constituent element corresponding to the privacy-policy manager 207, the link determiner 208, the link-information outputter 209 (the information outputter 212), the modifier 210a, the tentative-ID update controller 214, the tentative-ID updater 215, and so on. The information processor 403 is implemented by, for example, a processor, but may be implemented by a dedicated circuit or a microcomputer. The link-relationship information corresponds to the tentative-ID link relationship.

The generated link-relationship information is stored in the second storage 404. The second storage 404 is a constituent element corresponding to the tentative-ID link relationship manager 206 and is implemented by, specifically, a storage device, such as a semiconductor memory. The link-relationship information is stored in the second storage 404, for example, in the form of data as in each table illustrated in FIG. 8, but is not particularly limiting. The second storage 404 and the first storage 401 may also be realized as a single storage device. The log-information recorder 406 may also be configured in the same manner.

The log-information recorder 406 is a storage device in which a plurality of pieces of log information are recorded (stored) and is a constituent element corresponding to the log-information recorder 203. A plurality of pieces of log information are recorded in the log-information recorder 406 in association with the weights (e.g., the inverses of the degrees of uniqueness) of the pieces of log information, for example, as illustrated in FIG. 16. The log-information recorder 406 is implemented by, specifically, a storage device, such as a hard disk drive (HDD) or a semiconductor memory.

The obtainer 407 is a communication interface for obtaining personal information and log information from the first information communication apparatus 500 and is a constituent element corresponding to the information inputter 201. For example, the information processor 403 obtains personal information and log information from the first information communication apparatus 500 via the obtainer 407. The obtainer 407 is implemented by, specifically, a communication circuit (communication module) or the like, but may be realized as an entirety or part of a processor or microcomputer and may take any form.

The transmitter 408 is a communication interface for transmitting log information and so on to the second information communication apparatus 600 and is a constituent element corresponding to the communicator 210b. For example, the link information output by the information processor 403 is transmitted to the second information communication apparatus 600 via the transmitter 408. The transmitter 408 is implemented by, specifically, a commu- nication circuit (communication module) or the like, but may be implemented as an entirety or part of a processor or microcomputer and may take any form.

In the configuration described above, when the receiver 402 receives a request for a tentative ID at a timing other than the timing of the first tentative ID, the information processor 403 identifies the second tentative ID, which is the tentative ID at the other timing, by referring to the associations stored in the first storage 401. The information processor 403 then evaluates link-relationship information obtained when the first tentative ID is further linked to link-relationship information including a second tentative ID stored in the second storage 404. In accordance with a result of the evaluation, the information processor 403 determines whether or not link information indicating the second tentative ID is to be output.

With this arrangement, since the link information indicating the relationship of a plurality of tentative IDs corresponding to the same personal ID is output under a certain evaluation, it is possible to reduce the risk of an individual indicated by a personal ID being identified based on the link information. In turn, an external apparatus that receives the link information can analyze the log information by using the relationship of the plurality of tentative IDs.

More specifically, when the evaluation result is smaller than a predetermined value, the information processor 403 outputs link information indicating the second tentative ID, and when the evaluation result is larger than or equal to the predetermined value, the information processor 403 does not output link information indicating the second tentative ID.

Thus, the information processor 403 can determine whether or not the link information is to be output, based on whether or not the evaluation result is larger than or equal to the predetermined value. When the evaluation result is larger than or equal to the predetermined value, the information processor 403 outputs link information indicating the second tentative ID, and when the evaluation result is smaller than the predetermined value, the information processor 403 does not need to output link information indicating the second tentative ID. That is, the predetermined value (threshold) may be arbitrarily set depending on a reference for the evaluation.

The information processor 403 also evaluates updated link-relationship information, based on the number of tentative IDs linked in the updated link-relationship information. When the number of tentative IDs is smaller than a predetermined value, the information processor 403 outputs link information indicating the second tentative ID, and when the number of tentative IDs is larger than or equal to the predetermined value, the information processor 403 does not output link information indicating the second tentative ID.

With this arrangement, the information processor 403 can determine whether or not the link information is to be output, in accordance with the number of tentative IDs included in the link-relationship information.

The information processor 403 may also generate link-relationship information in which tentative IDs corresponding to a request received by the receiver 402 are linked in a tree structure. In this case, the information processor 403 may evaluate link-relationship information obtained by further linking the first tentative ID, based on the number of nodes included in the link-relationship information. When the number of nodes is smaller than a predetermined value, the information processor 403 outputs link information indicating the second tentative ID, and when the number of nodes is larger than or equal to the predetermined value, the information processor 403 does not output link information indicating the second tentative ID.

With this arrangement, the information processor 403 can determine whether or not the link information is to be output, in accordance with the number of nodes of the tentative IDs included in the link-relationship information.

The plurality of tentative IDs stored in the first storage 401 may be weighted, like the data 205b illustrated in FIG. 13. In this case, the information processor 403 may evaluate the link-relationship information obtained by further linking the first tentative ID, based on the total of the weights of the tentative IDs linked in the link-relationship information. More specifically, when the total weight is smaller than a predetermined value, the information processor 403 outputs link information indicating the second tentative ID, and when the total weight is larger than or equal to the predetermined value, the information processor 403 does not output link information indicating the second tentative ID.

With this arrangement, the information processor 403 can determine whether or not the link information is to be output, considering the weight of each tentative ID.

In the first storage 401, a larger weight may be assigned to a tentative ID whose corresponding log information is more unique.

With this arrangement, for a tentative ID that is given to log information whose degree of uniqueness is higher and with which it is easier to identify an individual, it is less likely that the link information is provided for the tentative ID.

In addition, as described above in the second embodiment, when the evaluation result is larger than or equal to the predetermined value, the information processor 403 may output statistical information obtained by statistical representation on a combination of log information given the second tentative ID and log information given a tentative ID other than the second tentative ID. The tentative ID other than the second tentative ID may be a tentative ID (e.g., the first tentative ID) at a timing other than the timing of the second tentative ID or may be a tentative ID associated with a personal ID other than a personal ID to which the second tentative ID corresponds to.

With this arrangement, even when the link information is not output, it is possible to perform log-information analysis using the statistical information.

As described above in the third embodiment, the information providing apparatus 400 may further include the eraser 405. The eraser 405 is a constituent element corresponding to the deletion checker 213 and is implemented by, specifically, a processor, a microcomputer, a dedicated circuit, or the like.

For example, upon obtaining, from the second information communication apparatus 600 (an external apparatus) that received link information output by the information processor 403, information indicating that the link information has been deleted, the eraser 405 erases at least the link of tentative IDs, included in the deleted link information, from the link-relationship information stored in the second storage 404 and associated with the deleted link information. That is, the eraser 405 performs processing as illustrated in FIG. 27. In this case, the eraser 405 may erase the entire link-relationship information including the deleted link information.

With this arrangement, when link information is erased in an external apparatus, it is possible to reset a criterion for determining whether or not the link information is to be output.

Also, for example, when the information providing apparatus 400 obtains, from the second information communication apparatus 600 (an external apparatus) that received log information, information indicating that the log information was deleted, the eraser 405 erases the link-relationship information stored in the second storage 404 and associated with a tentative ID given to the deleted log information. That is, the eraser 405 performs processing as illustrated in FIG. 28. In this case, the eraser 405 may erase at least the link of the tentative ID from the link-relationship information including the tentative ID given to the deleted log information.

With this arrangement, when log information is erased in the external apparatus, it is possible to reset a criterion for determining whether or not the link information is to be output.

Information from the eraser 405 is obtained, for example, via the receiver 402 and the information processor 403.

Also, as described in the fourth embodiment, each time the log information recorded in the log-information recorder 406 is given a third tentative ID and the resulting log information is provided, the information processor 403 may further sum the weight associated with the log information, and may update the third tentative ID when the summed weight is larger than or equal to a predetermined value. That is, the information processor 403 may perform processing as illustrated in FIG. 31.

With this arrangement, the information processor 403 can more finely update the tentative ID in accordance with the weights of the log information.

Although the information providing system, the information providing apparatus (data collecting apparatus), and so on according to one or more aspects have been described above in conjunction with the embodiments, the present disclosure is not limited to those embodiments. Modes obtained by applying various modifications conceived by those skilled in the art to the embodiments or modes constituted by combining the constituent elements in different embodiments may also be encompassed by the scope of one or more modes, as long as such modes do not depart from the spirit of the present disclosure.

The present disclosure is applicable to an information providing apparatus that anonymizes log information and provides the resulting log information.

What is claimed is:

1. An information providing apparatus, comprising:
an inputter that obtains log information and personal information corresponding to the log information;
a tentative ID giver that gives tentative IDs to the personal information, each of the tentative IDs being given at each predetermined timing;
a first storage that stores correspondence-relationship information indicating a correspondence relationship between the personal information and the each of the given tentative IDs;
a receiver that receives a request for outputting information including a requested tentative ID given at one past timing, on the request the requested tentative ID being identified by i) a current tentative ID given to the personal information and ii) the one past timing when the requested ID was given to the personal information;
an information processor that determines, in accordance with the request, link-relationship information indicating a correspondence relationship between the requested tentative ID and the current tentative ID, based on the correspondence-relationship information stored in the first storage;
a second storage that stores the determined link-relationship information; and
an outputter that outputs first information including the requested tentative ID or second information indicating that outputting of the first information is not permitted, based on the link-relationship information stored in the second storage.

2. The information providing apparatus according to claim 1,
wherein, when the receiver receives a request for outputting a tentative ID identified by a first tentative ID as the current ID and a second timing as the one past timing,
the information processor
identifies a second tentative ID, based on the correspondence-relationship information stored in the first storage, the second tentative ID being a tentative ID given at the second timing, and
determines whether or not to output the first information including the second tentative ID, based on the link-relationship information stored in the second storage,
updates the link-relationship information stored in the second storage when it is determined outputting the first information, and
the outputter outputs the first information or the second information, based on a result of the determination.

3. The information providing apparatus according to claim 2,
wherein the information processor determines whether or not the number of third tentative IDs having the correspondence relationship with the second tentative ID is smaller than a predetermined value, the third tentative IDs being included in the link-relationship information stored in the second storage, and
the outputter
outputs the first information when the number of the third tentative IDs is smaller than the predetermined value, and
outputs the second information when the number of the third tentative IDs is larger than or equal to the predetermined value.

4. The information providing apparatus according to claim 2,
wherein the link-relationship information stored in the second storage is represented as a tree structure in which the requested tentative ID and the current tentative ID serve as nodes; and
wherein the information processor determines whether or not the number of nodes linked to the second tentative ID in the tree structure is smaller than a predetermined value, and
the outputter
outputs the first information when the number of nodes is smaller than the predetermined value, and
outputs the second information when the number of nodes is larger than or equal to the predetermined value.

5. The information providing apparatus according to claim 2,
wherein, in the correspondence-relationship information stored in the first storage, weights are assigned to the respective tentative IDs;
wherein the link-relationship information stored in the second storage further includes a total value of the weight assigned to the requested tentative ID and the weight assigned to the current tentative ID; and wherein the information processor determines whether or not a total value of the weights corresponding to the second tentative ID is smaller than a predetermined value, and the outputter outputs the first information when the total value of the weights corresponding to the second tentative ID is smaller than the predetermined value, and outputs the second information when the total value of the weights corresponding to the second tentative ID is larger than or equal to the predetermined value.

6. The information providing apparatus according to claim 5, wherein, when the log information indicates viewing history for TV programs of a user corresponding to the personal information, each weight is assigned in accordance with a type of the TV program indicated by the log information corresponding to each tentative ID.

7. The information providing apparatus according to claim 2, wherein, for outputting of the second information, the outputter further outputs statistical information about the log information corresponding to a tentative ID other than the second tentative ID.

8. The information providing apparatus according to claim 1, further comprising:

an eraser that receives, from an external apparatus when the outputter outputs the first information to an external apparatus, information indicating that the first information is deleted in the external apparatus, and that erases a correspondence relationship regarding the requested tentative ID from the link-relationship information stored in the second storage.

9. The information providing apparatus according to claim 8, wherein the first information further includes the log information corresponding to the requested tentative ID.

10. The information providing apparatus according to claim 1, further comprising:

a log-information recorder that records the log information and a weight assigned to the log information, wherein, the information processor sums the weight assigned to the log information, each time the first information is output, and the tentative ID giver gives a different tentative ID at timing when the summed weight becomes larger than or equal to a predetermined value.

11. An information providing method comprising:

obtaining log information and personal information corresponding to the log information;

giving tentative IDs to the personal information, each of the tentative IDs being given at each predetermined timing;

generating correspondence-relationship information indicating a correspondence relationship between the personal information and the each of the given tentative IDs;

receiving a request for outputting information including a requested tentative ID given at one past timing, on the request the requested tentative ID being identified by i) a current tentative ID given to the personal information and ii) the one past timing when the requested ID was given to the personal information;

determining, in accordance with the request, link-relationship information indicating a correspondence relationship between the requested tentative ID and the current tentative ID, based on the generated correspondence-relationship information; and outputting first information including the requested tentative ID or second information indicating that outputting of the first information is not permitted, based on the determined link-relationship information.

12. An information providing system comprising:

a first information communication apparatus;

an information providing apparatus; and a second information communication apparatus, wherein the first information communication apparatus collects log information and personal information corresponding to the log information, wherein the information providing apparatus comprises an inputter that obtains, from the first information communication apparatus, the log information and the personal information corresponding to the log information, a tentative ID giver that gives tentative IDs to the personal information, each of the tentative IDs being given at each predetermined timing, a first storage that stores correspondence-relationship information indicating a correspondence relationship between the personal information and the each of the given tentative IDs, a receiver that receives, from the second information communication apparatus, a request for outputting information including a requested tentative ID given at one past timing, on the request the requested tentative ID being identified by i) a current tentative ID given to the personal information and ii) the one past timing when the requested ID was given to the personal information, an information processor that determines, in accordance with the request, link-relationship information indicating a correspondence relationship between the requested tentative ID and the current tentative ID, based on the correspondence-relationship information stored in the first storage, a second storage that stores the determined link-relationship information, and an outputter that outputs, to the second information communication apparatus, first information including the requested tentative ID or second information indicating that outputting of the first information is not permitted, based on the link-relationship information stored in the second storage.

* * * * *